US012476725B2

(12) United States Patent
Su et al.

(10) Patent No.: US 12,476,725 B2
(45) Date of Patent: Nov. 18, 2025

(54) BROADCAST SIGNAL PLAYBACK METHOD, MAP GENERATION METHOD, AND APPARATUS

(71) Applicant: SHENZHEN YINWANG INTELLIGENT TECHNOLOGIES CO., LTD., Shenzhen (CN)

(72) Inventors: Derun Su, Nanjing (CN); Xiushuai Cui, Nanjing (CN); Guicheng Zhang, Nanjing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 381 days.

(21) Appl. No.: 18/178,112

(22) Filed: Mar. 3, 2023

(65) Prior Publication Data

US 2023/0208541 A1 Jun. 29, 2023

Related U.S. Application Data

(63) Continuation of application No. PCT/CN2021/115347, filed on Aug. 30, 2021.

(30) Foreign Application Priority Data

Sep. 4, 2020 (CN) ........................ 202010921926.X

(51) Int. Cl.
*H04H 60/78* (2008.01)
*H04H 20/57* (2008.01)

(52) U.S. Cl.
CPC ............ *H04H 60/78* (2013.01); *H04H 20/57* (2013.01)

(58) Field of Classification Search
CPC ........ H04H 60/42; H04H 20/57; H04H 60/78; H04H 2201/13; H04H 60/41
See application file for complete search history.

(56) References Cited

U.S. PATENT DOCUMENTS

2005/0153650 A1 7/2005 Hikomoto
2010/0267409 A1 10/2010 Lee et al.
(Continued)

FOREIGN PATENT DOCUMENTS

CN 101227745 A 7/2008
CN 102202261 A 9/2011
(Continued)

OTHER PUBLICATIONS

JP 4012009 B2), Hagg, Data Reproduction Method And Data Reproduction Apparatus, Nov. 2007, pp. 1-13 (Year: 2007).*
(Continued)

*Primary Examiner* — Keith Ferguson
(74) *Attorney, Agent, or Firm* — Fish & Richardson P.C.

(57) ABSTRACT

The application discloses example methods and apparatuses for map generation and for playing broadcast signals. One example map generation method includes receiving multiple pieces of first information, where each piece of the multiple pieces of first information includes a corresponding positioning location of a corresponding terminal, strength of a broadcast signal modulated at a first modulation frequency and received by the corresponding terminal at the corresponding positioning location, and the first modulation frequency. A broadcast signal strength layer is generated according to the multiple pieces of first information, where the broadcast signal strength layer represents a first coverage range corresponding to a first strength range of a broadcast signal modulated at the first modulation frequency.

10 Claims, 14 Drawing Sheets

(56) References Cited

U.S. PATENT DOCUMENTS

| | | | | |
|---|---|---|---|---|
| 2010/0304702 | A1* | 12/2010 | Anzures ................. | H04H 20/22<br>455/313 |
| 2015/0124971 | A1 | 5/2015 | Haslam | |

FOREIGN PATENT DOCUMENTS

| | | | |
|---|---|---|---|
| CN | 102255680 | A | 11/2011 |
| CN | 102833022 | A | 12/2012 |
| CN | 103166724 | A | 6/2013 |
| CN | 107210829 | A | 9/2017 |
| JP | H1155135 | A | 2/1999 |
| JP | H11289267 | A | 10/1999 |
| JP | 2013201469 | A | 10/2013 |
| WO | 2020040778 | A1 | 2/2020 |

OTHER PUBLICATIONS

Extended European Search Report in European Appln No. 21863581.1, dated Jan. 23, 2024, 7 pages.

* cited by examiner

BROADCAST SIGNAL PLAYBACK METHOD, MAP GENERATION METHOD, AND APPARATUS

CROSS-REFERENCE TO RELATED APPLICATIONS

This application is a continuation of International Application No. PCT/CN2021/115347, filed on Aug. 30, 2021, which claims priority to Chinese Patent Application No. 202010921926.X, filed on Sep. 4, 2020. The disclosures of the aforementioned applications are hereby incorporated by reference in their entireties.

TECHNICAL FIELD

This application relates to the field of communications technologies and connected vehicle technologies, and in particular, to a broadcast signal playback method, a map generation method, and an apparatus.

BACKGROUND

With the continuous development of network technologies and the continuous progress of video and audio compression technologies, digitalization technologies for multimedia content are continuously updated. This enables video and audio information to be transmitted quickly through the network.

Over-the-air broadcast is usually based on amplitude modulation (AM) and frequency modulation (FM). AM and FM refer to two different modulation schemes in radio science. Audio signals broadcast over the air are transmitted in the form of analog signals through radio broadcast transmission apparatuses set up by broadcasters.

Network broadcast uses networks (such as the Internet and wireless cellular networks) as media to transmit audio signals in the form of standard IP data packets on local area networks and wide area networks. Users can listen to network stations as long as network signals can be received, without geographical restrictions.

At present, many broadcasters not only use the conventional radio over-the-air broadcast mode to transmit programs, but also set up multimedia streaming servers, so that audio signals can be transmitted through network broadcast.

Signals transmitted through over-the-air broadcast may be shielded by shielding objects (such as subways and shielded buildings) in an environment where a terminal (such as a receiver) is located, or the quality of terminals may be different. As a result, a user cannot hear the radio or the effect is poor. The network may have poor signal quality, which affects the listening effect, and usually causes extra fees. As a result, when a user listens to a radio program by using a terminal, the user often needs to switch between over-the-air broadcast and network broadcast due to the foregoing reasons. However, because transmission of the over-the-air broadcast and the network broadcast is not synchronous, a problem of lagging or missing some content may occur after the switching, thereby reducing user experience.

SUMMARY

This application provides a broadcast signal playback method, a map generation method, and an apparatus, to improve broadcast listening experience.

According to a first aspect, this application provides a map generation method. The method may be performed by a map generation apparatus. The map generation apparatus may be a communications device or a communications apparatus that can support the communications device to implement a function in the method, for example, a chip system. For example, the map generation apparatus may be a map server. The method may include: receiving a plurality of pieces of first information, where each piece of the first information includes a positioning location of a terminal, strength of a broadcast signal modulated at a first modulation frequency and received by the terminal at the positioning location, and the first modulation frequency; and generating a broadcast signal strength layer according to the plurality of pieces of first information, where the broadcast signal strength layer is used to represent a first coverage range corresponding to a first strength range of a broadcast signal modulated at the first modulation frequency.

By using the foregoing method, a broadcast signal strength layer of a broadcast signal corresponding to a first modulation frequency may be generated by using a plurality of pieces of received first information, where the broadcast signal strength layer may represent a correspondence between a positioning location and strength of the broadcast signal, so that in a moving process in which a terminal listens to a broadcast, based on the newly added broadcast signal strength layer on the map, the terminal may be instructed to switch to another broadcast signal at a location at which broadcast signal strength is relatively low, thereby improving broadcast listening experience. In addition, based on the newly added broadcast signal strength layer on the map, it may be determined in advance that an area in which a broadcast signal is weak is to be entered, so as to switch the broadcast signal in advance, thereby avoiding switching after a received broadcast signal is excessively weak and a listening effect is relatively poor, and improving listening experience of a user.

In a possible implementation, a boundary of the first coverage range is determined according to the plurality of positioning locations in the plurality of pieces of first information.

By using the foregoing method, positioning locations corresponding to same broadcast signal strength may be determined in broadcast signal strength layers, so as to determine a boundary of the first coverage range, so that the terminal better determines a location with relatively low broadcast signal strength, and the terminal better determines a switching occasion.

In a possible implementation, the boundary of the first coverage range is determined according to a plurality of comparison results obtained by separately comparing strength that is of broadcast signals received by the terminal at the positioning locations and that is in the plurality of pieces of first information with a preset first strength threshold, and the plurality of positioning locations in the plurality of pieces of first information.

By using the foregoing method, same or similar broadcast signal strength in the plurality of pieces of first information may be compared with the preset first strength threshold, so that the boundary of the first coverage range can be better determined.

In a possible implementation, the broadcast signal strength layer is further used to represent a second coverage range corresponding to a second strength range of a broadcast signal modulated at the first modulation frequency.

By using the foregoing method, coverage ranges corresponding to a plurality of strength ranges may be set on a map, so that when performing signal switching based on the broadcast signal strength layer, the terminal may select different strength ranges, to better adapt to various different scenarios in which the terminal performs signal switching based on the broadcast signal strength layer, improving the applicability of the broadcast signal strength layer.

In a possible implementation, a plurality of pieces of second information is received, where each piece of the second information includes a positioning location of a terminal, strength of a broadcast signal modulated at a second modulation frequency and received by the terminal at the positioning location, and the second modulation frequency; and generating the broadcast signal strength layer according the plurality of pieces of second information, where the broadcast signal strength layer is further used to represent at least one coverage range corresponding to at least one strength range of a broadcast signal modulated at the second modulation frequency.

By using the foregoing method, a broadcast signal strength layer corresponding to a broadcast signal of a second modulation frequency may be further generated on the map based on a plurality of pieces of second information, so that more broadcast signal switching scenarios can be adapted, and applicability of the map can be improved.

In a possible implementation, the at least one coverage range corresponding to the at least one strength range is preset according to a modulation frequency of a broadcast signal and geographic information. The broadcast signal strength layer is generated based on the at least one preset coverage range corresponding to the at least one strength range by training data in the plurality of pieces of first information, where the plurality of pieces of first information are from a plurality of terminals.

By using the foregoing method, a broadcast signal strength layer may be trained based on first information collected by a plurality of terminals. Therefore, more accurate and trusted broadcast signal strength distribution can be obtained, so that the terminal better determines a location with relatively low broadcast signal strength, the terminal better determines a switching occasion, and listening experience of the terminal is improved.

According to a second aspect, this application provides a map generation method. The method may be performed by a map generation apparatus. The map generation apparatus may be a communications device or a communications apparatus that can support the communications device to implement a function in the method, for example, a chip system. For example, the map generation apparatus may be a terminal device, a vehicle, or an in-vehicle apparatus. The method may include: obtaining a first positioning location of the terminal; detecting strength of a broadcast signal received by the terminal at the first positioning location; and sending first information to a server, where the first information includes the first positioning location, the strength of the broadcast signal received by the terminal at the first positioning location, and a modulation frequency of the broadcast signal, and the first information is used to determine a coverage range corresponding to a strength range of a broadcast signal in a broadcast signal strength layer.

By using the foregoing method, the terminal may send the first information to a map server based on the detected strength of the broadcast signal received at the first positioning location, so that the map server can determine, based on the received first information, a coverage range corresponding to the strength range of the broadcast signal in the broadcast signal strength layer, and provide data basis for the map server to generate the broadcast signal strength layer.

In a possible implementation, before the first information is sent to the server, it may be further determined, by comparing the strength of the broadcast signal received by the terminal at the first positioning location with the preset threshold of the strength range, that the first positioning location is at a boundary of the coverage range.

By using the foregoing method, after comparing the strength of the broadcast signal received at the first positioning location with the preset threshold of the strength range, the terminal may not report the first information if determining that the strength is not close to the threshold, or report the first information if determining that the strength is close to the threshold, so as to reduce overheads of reporting the first information by the terminal. In addition, power consumption occupied by the map server for processing the first information can be further reduced, and map generation efficiency can be improved.

According to a third aspect, this application provides a broadcast signal playback method. The method may be performed by a broadcast signal playback apparatus. The broadcast signal play apparatus may be a communications device or a communications apparatus that can support the communications device to implement a function in the method, for example, a chip system. For example, the broadcast signal playback apparatus may be a terminal device, a vehicle, or an in-vehicle apparatus. The following uses an example in which the apparatus for playing a broadcast signal is a terminal for description. The method includes: A terminal receives a broadcast signal strength layer from a map server, where the broadcast signal strength layer is a map layer, and the broadcast signal strength layer is used to represent a coverage range of a broadcast signal corresponding to a strength level of the broadcast signal; and the terminal switches, at a first moment according to a current positioning location of the terminal, a current motion status of the terminal, a future driving path of the terminal, and the broadcast signal strength layer, from a first state in which only a first broadcast signal is received to a second state in which both a first broadcast signal and a second broadcast signal are received, where types of the first broadcast signal and the second broadcast signal are different; the terminal plays the received first broadcast signal at a single rate when being in the first state; and the terminal plays the received first broadcast signal when being in the second state.

By using the foregoing method, the terminal may determine, in advance based on the newly added broadcast signal strength layer on the map, that the terminal is about to enter an area with a weak broadcast signal, that is, determine that the first moment is a moment about to enter an area with a weak broadcast signal, so as to enter the second state in advance, and make a preparation for switching a broadcast signal based on both the first broadcast signal and the second broadcast signal that are simultaneously received in the second state, so as to avoid switching after a received broadcast signal is excessively weak and a listening effect is relatively poor, thereby improving listening experience of a user.

In a possible implementation, there is a delay in the second broadcast signal relative to the first broadcast signal, and the terminal plays the first broadcast signal at a rate lower than a single rate when being in the second state. In this case, the terminal switches, at the second moment, from the second state to a third state in which only the second broadcast signal is received, where the second moment is a moment of first synchronization between the played first broadcast signal and the received second broadcast signal.

The terminal plays the second broadcast signal at the single rate when being in the third state.

By using the foregoing method, when the currently played first broadcast signal is slower than the received second broadcast signal, the first broadcast signal may be played at a rate lower than a single rate in the second state, so that when the second state ends, the played first broadcast signal and the received broadcast signal may be synchronized, therefore, a problem that a delay may occur after direct switching is avoided, seamless switching of a broadcast signal can be implemented, and listening experience of a user is improved.

In a possible implementation, there is a delay in the first broadcast signal relative to the second broadcast signal, and the terminal plays the first broadcast signal at the single rate and buffers the received second broadcast signal when being in the second state. In this case, the terminal switches, at the second moment, from the second state to a third state in which only the second broadcast signal is received, where the second moment is a moment of second synchronization between the played first broadcast signal and a start buffered second broadcast signal. The terminal plays the buffered second broadcast signal at a rate higher than the single rate when being in the third state, and continues to buffer the received second broadcast signal. The terminal switches from the third state to a fourth state at a third moment, where the third moment is a moment of third synchronization between the buffered second broadcast signal and the played second broadcast signal. The terminal plays the received second broadcast signal at the single rate when being in the fourth state.

By using the foregoing method, when the currently played first broadcast signal is faster than the received second broadcast signal, the second broadcast signal may be buffered in the second state, and the received second broadcast signal may be synchronized with the currently played first broadcast signal when the second state ends, so that the third state is started when the second state ends, and the second broadcast signal is played at a rate higher than the single rate in the third state, to catch up with the received second broadcast signal. In other words, when the third state ends, the played second broadcast signal may be synchronized with the received second broadcast signal, therefore, switching is completed in the fourth state. According to the method, a problem of missing listening that may occur after direct switching can be avoided, seamless switching of a broadcast signal can be implemented, and listening experience of a user can be improved.

According to a fourth aspect, this application provides a map generation apparatus. The map generation apparatus may be applied to a map server or a chip system of the map server. The map generation apparatus may include a receiving unit and a processing unit. The receiving unit is configured to receive a plurality of pieces of first information, where each piece of the first information includes a positioning location of a terminal, strength of a broadcast signal modulated at a first modulation frequency and received by the terminal at the positioning location, and the first modulation frequency. A processing unit is configured to generate a broadcast signal strength layer according to the plurality of pieces of first information, where the broadcast signal strength layer is used to represent a first coverage range corresponding to a first strength range of a broadcast signal modulated at the first modulation frequency.

In a possible implementation, the processing unit is specifically configured to determine a boundary of the first coverage range according to a plurality of positioning locations in the plurality of pieces of first information.

In a possible implementation, the processing unit is specifically configured to determine the boundary of the first coverage range according to a plurality of comparison results obtained by separately comparing strength that is of broadcast signals received by the terminal at the positioning locations and that is in the plurality of pieces of first information with a preset first strength threshold, and the plurality of positioning locations in the plurality of pieces of first information.

In a possible implementation, the broadcast signal strength layer is further used to represent a second coverage range corresponding to a second strength range of a broadcast signal modulated at the first modulation frequency.

In a possible implementation, the receiving unit is further configured to receive a plurality of pieces of second information, where each piece of the second information includes a positioning location of a terminal, strength of a broadcast signal modulated at a second modulation frequency and received by the terminal at the positioning location, and the second modulation frequency. The processing unit is further configured to generate the broadcast signal strength layer according the plurality of pieces of second information, where the broadcast signal strength layer is further used to represent at least one coverage range corresponding to at least one strength range of a broadcast signal modulated at the second modulation frequency.

In a possible implementation, the processing unit is further configured to preset, according to a modulation frequency of a broadcast signal and geographic information, the at least one coverage range corresponding to the at least one strength range, and generate the broadcast signal strength layer based on the at least one preset coverage range corresponding to the at least one strength range by training data in the plurality of pieces of first information, where the plurality of pieces of first information are from a plurality of terminals.

According to a fifth aspect, an embodiment of this application provides a map generation apparatus. The map generation apparatus may be applied to a map server or a chip system of the map server. The map generation apparatus includes a processor, configured to implement the method described in the first aspect. The apparatus may further include a memory, configured to store a program and an instruction. The memory is coupled to the processor, and the processor executes the program instructions stored in the memory to implement the method described in the first aspect. The apparatus may further include an interface circuit. The interface circuit is used by the apparatus to communicate with another device. For example, the interface circuit may be a transceiver, a circuit, a bus, a module, or an interface circuit of another type. For example, the map generation apparatus is a map server, or a chip disposed in a map server. The transceiver is implemented, for example, by using an antenna, a feeder, and a codec in the map server. Alternatively, if the map generation apparatus is a chip disposed in the map server, the interface circuit is, for example, a communications interface in the chip, and the communications interface is connected to a radio frequency transceiver component in the map server, so as to implement information receiving and sending by using the radio frequency transceiver component.

For technical effects of the fourth aspect and the fifth aspect or the possible implementations, refer to descriptions of technical effects of the first aspect or the corresponding implementations.

According to a sixth aspect, this application provides a map generation apparatus. The map generation apparatus may be applied to a terminal device, a vehicle, or an in-vehicle apparatus. The map generation apparatus may include: an obtaining unit, configured to obtain a first positioning location of the terminal; a detection unit, configured to detect strength of a broadcast signal received by the terminal at the first positioning location; and a sending unit, configured to send first information to a server, where the first information includes the first positioning location, the strength of the broadcast signal received by the terminal at the first positioning location, and a modulation frequency of the broadcast signal, and the first information is used to determine a coverage range corresponding to a strength range of a broadcast signal in a broadcast signal strength layer.

In a possible implementation, the apparatus further includes a processing unit, configured to: before the sending unit sends the first information to the server, determine, by comparing the strength of the broadcast signal received by the terminal at the first positioning location with a preset threshold of the strength range, that the first positioning location is at a boundary of the coverage range.

According to a seventh aspect, an embodiment of this application provides a map generation apparatus. The map generation apparatus may be applied to a terminal device, a vehicle, or an in-vehicle apparatus. The map generation apparatus includes a processor, configured to implement the method described in the second aspect. The apparatus may further include a memory, configured to store a program and an instruction. The memory is coupled to the processor, and the processor executes the program instructions stored in the memory to implement the method described in the second aspect. The apparatus may further include an interface circuit. The interface circuit is used by the apparatus to communicate with another device. For example, the interface circuit may be a transceiver, a circuit, a bus, a module, or an interface circuit of another type. For example, the map generation apparatus is a terminal device, or a chip disposed in a terminal device. The transceiver is implemented, for example, by using an antenna, a feeder, and a codec in the terminal device. Alternatively, if the map generation apparatus is a chip disposed in the terminal device, the interface circuit is, for example, a communications interface in the chip, and the communications interface is connected to a radio frequency transceiver component in the terminal device, so as to implement information receiving and sending by using the radio frequency transceiver component. For technical effects of the sixth aspect and the seventh aspect, refer to descriptions of technical effects of the second aspect and the corresponding implementations.

According to an eighth aspect, this application provides a broadcast signal playback apparatus that may be applied to a terminal device, a vehicle, or an in-vehicle apparatus. The broadcast signal playback apparatus may include a receiving unit and a processing unit. The receiving unit is configured to receive a broadcast signal strength layer from a map server, where the broadcast signal strength layer is a map layer, and the broadcast signal strength layer is used to represent a coverage range of a broadcast signal corresponding to a strength level of the broadcast signal. The processing unit is configured to switch, at a first moment according to a current positioning location of the terminal, a current motion status of the terminal, a future driving path of the terminal, and the broadcast signal strength layer, from a first state in which only a first broadcast signal is received to a second state in which both a first broadcast signal and a second broadcast signal are received, where types of the first broadcast signal and the second broadcast signal are different; play the received first broadcast signal at a single rate by using a playback unit when the terminal is in the first state; and play the received first broadcast signal by using the playback unit when the terminal is in the second state.

In a possible implementation, there is a delay in the second broadcast signal relative to the first broadcast signal, and the processing unit is configured to play the first broadcast signal at a rate lower than the single rate by using the playback unit when the terminal is in the second state. The processing unit is further configured to switch, at a second moment, from the second state to a third state in which only the second broadcast signal is received, where the second moment is a moment of first synchronization between the played first broadcast signal and the received second broadcast signal; and play the second broadcast signal at the single rate by using the playback unit when the terminal is in the third state.

In a possible implementation, there is a delay in the first broadcast signal relative to the second broadcast signal, and the processing unit is configured to play the first broadcast signal at the single rate by using the playback unit, and buffer the received second broadcast signal when the terminal is in the second state. The processing unit is further configured to: switch, at the second moment, from the second state to a third state in which only the second broadcast signal is received, where the second moment is a moment of second synchronization between the played first broadcast signal and a start buffered second broadcast signal; play the buffered second broadcast signal at a rate higher than the single rate by using the playback unit when the terminal is in the third state, and continue to buffer the received second broadcast signal; switch from the third state to a fourth state at a third moment, where the third moment is a moment of third synchronization between the buffered second broadcast signal and the played second broadcast signal; and play the received second broadcast signal at the single rate by using the playback unit when the terminal is in the fourth state.

According to a ninth aspect, this application provides a broadcast signal playback apparatus. The broadcast signal playback apparatus may be applied to a terminal device, a vehicle, or an in-vehicle apparatus. The broadcast signal playback apparatus includes a processor, configured to implement the method described in the third aspect. The apparatus may further include a memory, configured to store a program and an instruction. The memory is coupled to the processor, and the processor executes the program instructions stored in the memory to implement the method described in the third aspect. The apparatus may further include an interface circuit. The interface circuit is used by the apparatus to communicate with another device. For example, the interface circuit may be a transceiver, a circuit, a bus, a module, or an interface circuit of another type. For example, the broadcast signal playback apparatus is an in-vehicle device, or a chip disposed in an in-vehicle device. The transceiver is implemented, for example, by using an antenna, a feeder, and a codec in the in-vehicle device. Alternatively, if the broadcast signal playback apparatus is a chip disposed in the in-vehicle device, the interface circuit is, for example, a communications interface in the chip, and the communications interface is connected to a radio frequency transceiver component in the in-vehicle device, so as to implement information receiving and sending by using the radio frequency transceiver component. For technical effects of the eighth aspect, the ninth aspect or the possible implementations, refer to descriptions of technical effects of the third aspect or the corresponding implementations.

According to a tenth aspect, a communications system is provided. The communications system includes the map generation apparatus according to the fourth aspect or the fifth aspect, and the map generation apparatus according to the sixth aspect or the seventh aspect, and may further include the broadcast signal playback apparatus according to the eighth aspect or the ninth aspect.

According to an eleventh aspect, a computer storage medium is provided. The computer-readable storage medium stores an instruction. When the instruction is run on a processor, the positioning apparatus is enabled to perform the method in any one of the first aspect, the second aspect, or the possible implementations of the third aspect.

According to a twelfth aspect, a computer program product including an instruction is provided, where the computer program product stores the instruction. When the instruction is run on a processor, the positioning apparatus is enabled to perform the method in any one of the first aspect, the second aspect, or the possible implementations of the third aspect.

DESCRIPTION OF EMBODIMENTS

Figure 1A:
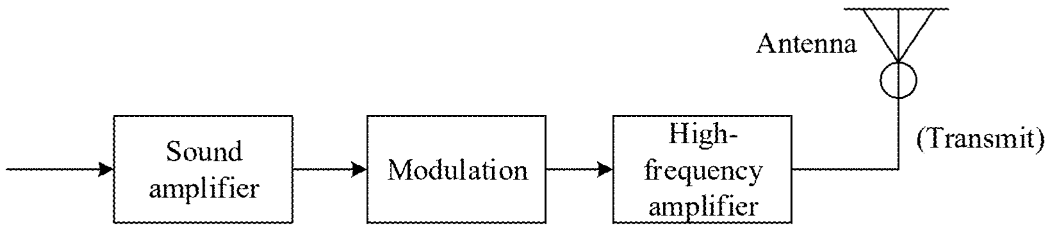
FIG. 1*a* to FIG. 1*b* are schematic diagrams of a structure of an over-the-air broadcast signal transceiver apparatus in the prior art.

For ease of understanding, terms used in the embodiments of this application are explained and described, and explanations and descriptions of the terms are also used as a part of the embodiments of this application.

(1) A terminal device may be a device that provides a user with voice and/or data connectivity, for example, may be a handheld device with a wireless connection function, or a processing device connected to a wireless modem. The terminal device may communicate with a core network through a radio access network (RAN), and exchange a voice and/or data with the RAN. The terminal device may include a user equipment (UE), a wireless terminal device, a mobile terminal device, a device-to-device (D2D) terminal device, a V2X terminal device, a machine-to-machine/machine-type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, terminal device may include a mobile phone (or referred to as a “cellular” phone), a computer with a mobile terminal device, and a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device alternatively includes a limited device, for example, a device having low power consumption, a device having a limited storage capability, or a device having a limited computing capability. For example, the terminal device includes an information sensing device such as a barcode, a radio frequency identification (RFID), a sensor, a global positioning system (GPS), or a laser scanner.

In this application, the terminal device may alternatively be an in-vehicle apparatus, for example, an on board unit (OBU), and is usually installed on a vehicle. In an ETC system, a roadside unit (RSU) is installed on a roadside, and the OBU may communicate with the RSU, for example, communication may be performed by using a microwave. When a vehicle passes through an RSU, a microwave can be used for communication between the OBU and the RSU. In an electronic toll collection (ETC) system, an OBU uses a dedicated short-range communications (DSRC) technology to establish a microwave communication link with an RSU. On the way of a vehicle, a process such as vehicle identification or electronic fee deduction can be implemented without stopping the vehicle. Alternatively, in addition to the OBU, the in-vehicle apparatus may further be another apparatus installed on a vehicle. For example, if various terminal devices described below are located on a vehicle (for example, placed in the vehicle or installed in the vehicle), the terminal devices may be considered as in-vehicle apparatuses, or referred to as in-vehicle apparatuses. An in-vehicle system may include at least a vehicle, an in-vehicle network, and an in-vehicle apparatus. The in-vehicle apparatus includes various sensors, a GNNS receiving module, and the like.

As an example instead of a limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not merely a hardware device, but is used to implement a powerful function through software support, data interaction, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

(2) An electronic map, also called digital map, is a map that uses computer technologies to store and view in digital mode. For example, a navigation map and a high-precision map. A navigation map is map data used by drivers. It is an electronic map (or digital map) that provides road-level navigation functions and provides map display, location positioning, and road guidance functions. Generally, the precision reaches the meter level. A high-precision map is map data (including lanes, roads, traffic signs, traffic lights, and positioning layers) used by self-driving vehicles. It is an electronic map that provides high-precision positioning, road-level and lane-level planning, and guidance functions. The precision of a high-precision map can reach the centimeter level. In addition to high-precision coordinate information, there is also accurate road condition information, for example, lane length and width, slope, and curvature. The electronic map may be stored in a map server, or may be stored in an in-vehicle apparatus or a roadside apparatus, which is not limited herein. A map server that stores a high-precision map may transfer these target locations (or feature locations) to a vehicle ("ego-car") that has a self-driving or an assisted driving function, so that safe and smooth self-driving experience of the vehicle can be improved.

(3) The terms "system" and "network" may be used interchangeably in embodiments of this application. "At least one" means one or more, and "a plurality of" means two or more. The term and/or describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, the first road and the second road are merely used to distinguish between different roads, but do not indicate different priorities, importance degrees, or the like of the two roads.

The following describes in detail embodiments of this application with reference to accompanying drawings.

Broadcast is one of the most frequently used services during driving. Currently, there are mainly two types of signal sources for in-vehicle receivers: over-the-air broadcast and Internet-based network broadcast.

Figure 1B:
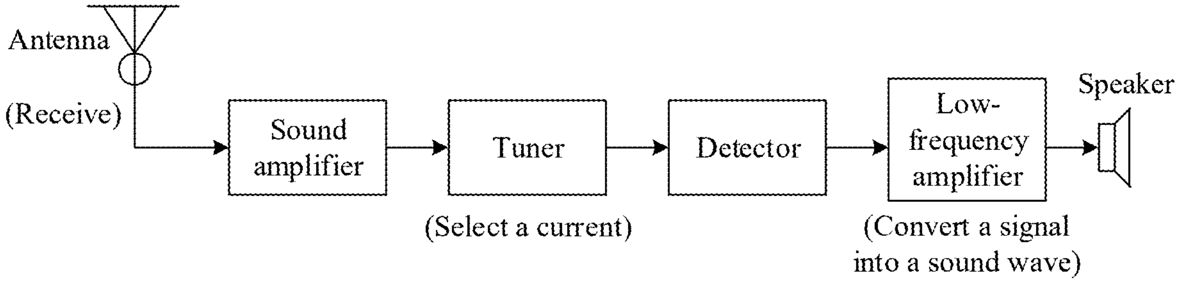

FIG. 1*a* is a schematic diagram of an example of a signal transmit end for over-the-air broadcast, and FIG. 1*b* is a schematic diagram of an example of a signal receive end for over-the-air broadcast.

As shown in FIG. 1*a*, at a signal transmit end for over-the-air broadcast, a sound signal is converted into a low-frequency current. The low-frequency current is amplified by a sound amplifier, and is modulated to obtain a modulated wave (the modulation processing is a process of attaching a sound signal to a high-energy carrier). Then, the signal is amplified by a high-frequency amplifier and transmitted by an antenna.

Information broadcast over the air is real-time, and users do not need to pay extra fees. However, FM signals are greatly affected by buildings or terrains (for example, poor signals in tunnels, underground parking lots, and remote mountainous areas).

As shown in FIG. 1*b*, at a signal receive end for over-the-air broadcast, a radio broadcast signal is received by using an antenna. The signal is amplified by a sound amplifier, demodulated by a tuner, detected by a detector, converted into a sound wave by a low-frequency amplifier, and finally played by a speaker.

Figure 2A:
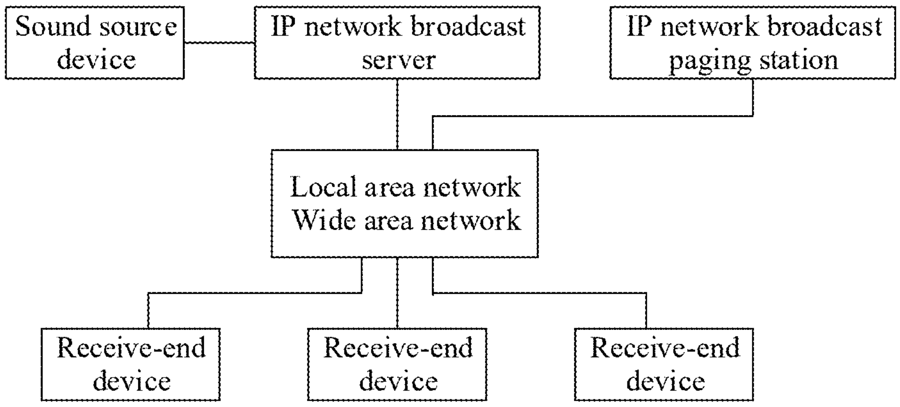
FIG. 2*a* is a schematic diagram of a structure of a network broadcast system in the prior art.
Figure 2B:
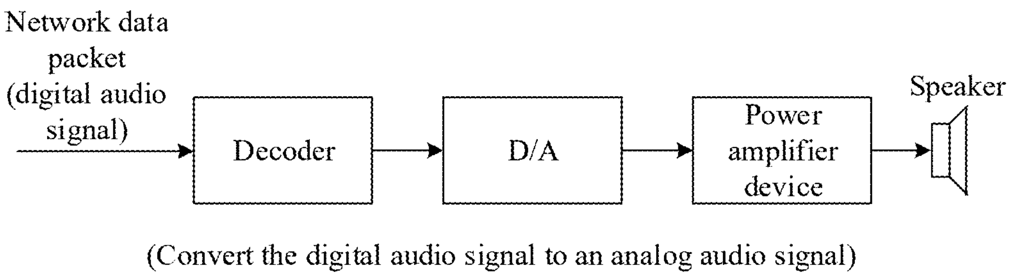
FIG. 2*b* is a schematic diagram of a structure of a network broadcast receive end device in the prior art.

FIG. 2*a* is a schematic diagram of an example of a signal transmit end of a network station, and FIG. 2*b* is a schematic diagram of an example of a signal receive end of a network station.

As shown in FIG. 2*a*, the network station may be implemented by using an IP network broadcast system. The IP network broadcast system is a broadcast system based on network transmission. A communication protocol is TCP/IP. A network (such as a local area network or a wide area network) is used for communication and transmission of broadcast audio signals. The working principle of the IP network broadcast system generally includes two aspects: First, TCP/IP network protocol is used to perform communication and transmission of broadcast audio signals by using the network. Second, digital-to-analog conversion is performed to convert analog broadcast audio signals into digital audio signals, and then to compress the digital audio signals into data packets that can be transmitted on the network. Then, the data packets are transmitted to a destination area through the network. As shown in FIG. 2*b*, in a destination area, a decoder at a receive end receives a network data packet, converts a digital audio signal into an analog audio signal, and outputs the analog audio signal to a power amplification device. The power amplification device amplifies the audio signal, and then a speaker emits a sound.

Because the network station can rely on a mobile network with wide coverage, the coverage area is wide and the signal is stable. However, the broadcast content of the network station is delayed and is limited by the network bandwidth and network speed. In addition, to listen to the broadcast of the network station, users need to pay for the mobile network traffic.

A single broadcast signal source has its own advantages and disadvantages. If the advantages of two signal sources can be combined and the FM signal strength and network signal strength can be monitored in real time, different signal sources can be used in different areas to complete switching between FM and network broadcast signal sources, providing better broadcast listening experience for users. For example, users can receive FM signals and listen to the broadcast in an area where FM signals are stable. A station application monitors the FM signal strength in real time. When a vehicle enters a special area such as a tunnel, the FM signal strength becomes weak. When the FM signal strength is lower than a threshold and the network broadcast signal strength is stable, the station application automatically switches the signal source to network broadcast. When the vehicle leaves the special area and the station application detects that the FM signal strength is higher than the strength threshold, the station application switches the signal source from network broadcast to FM again. However, because a specific detection period is used for monitoring that an FM signal changes from strong to weak or from weak to strong, in a time window, quality of a broadcast heard by a user may be relatively poor due to an unstable FM signal, and problems such as audio freezing or blurring exist. In addition, there is a delay between FM and network broadcast (FM is "faster" than network broadcast). When FM signals are directly switched to network broadcast signals, users listen to a broadcast repeatedly. When network broadcast signals are directly switched to FM signals, users miss a broadcast. In a word, a hard handover method has an audio jump problem, which affects a listening effect.

Based on the foregoing problem, this application provides a broadcast signal playback method based on a map layer, to ensure stable and continuous quality of audio listened to by a user in a source switching process, and the user does not need to perform manual switching, thereby improving a broadcast listening effect of the user. The map construction method and the broadcast signal playback method provided in the embodiments of this application may be applied to a connected vehicle system. Vehicles in the networked vehicle system can use conventional maps and high-precision maps to implement broadcast listening services. The broadcast listening service described in the embodiments of this application may be further implemented in a service process of self-driving and assisted driving. The map construction method and the broadcast signal playback method provided in the embodiments of this application may be further applied to communications (vehicle to x, V2X) services between a vehicle and other apparatuses, where V2X is, for example, vehicle to vehicle communication (V2V), vehicle to infrastructure communication (V2I), and the like. This is not limited herein.

Figure 3A:
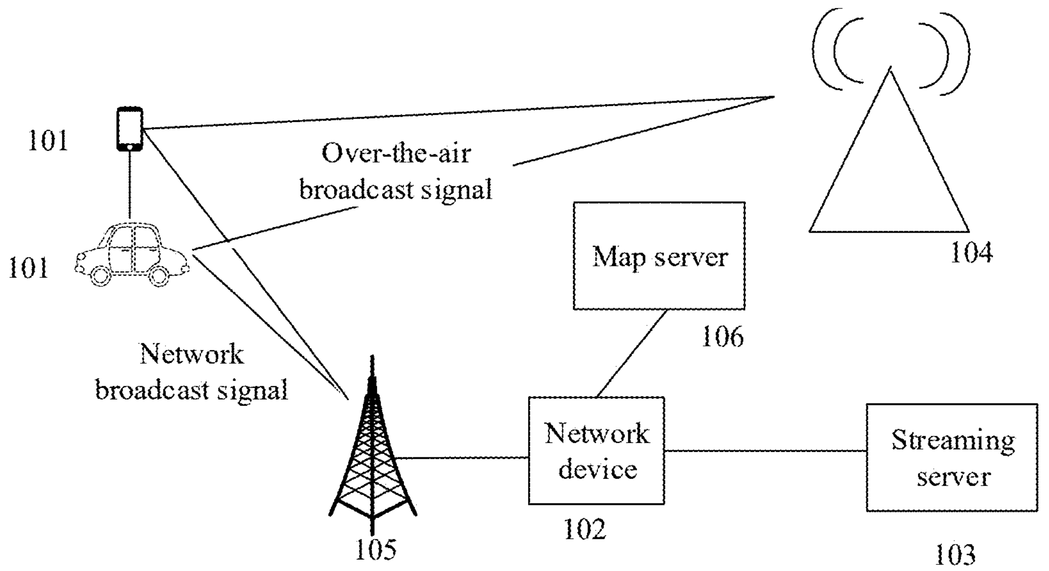
FIG. 3*a* is a schematic diagram of an architecture of a broadcast system to which an embodiment of this application is applicable.

The embodiments of this application may be applied to a system architecture shown in FIG. 3*a*. FIG. 3*a* is a schematic diagram of an architecture of a possible communications system to which an embodiment of this application is applicable. The communications system includes: a terminal device 101, a network device 102, an access device 105, a streaming media server 103 (or an IP network broadcast server), a radio broadcast signal transmitter 104, and a map server 106 (a map server, a positioning server, and the like may be included).

The radio broadcast signal transmitter 104 may modulate an audio signal provided by a station signal source into a radio broadcast signal for transmission. The streaming media server 103 (or the IP network broadcast server) may convert a broadcast station audio signal (analog signal) provided by a station signal source into a digital audio signal, and transmit the digital audio signal through a network. The streaming media server 103 may be a device or a streaming media server system formed by a group of devices, so as to implement the foregoing functions. The terminal device 101 has functions of receiving and playing an over-the-air broadcast signal. In an over-the-air broadcast working mode, the terminal may receive and play a radio broadcast signal sent by a radio broadcast signal transmitter. In a network station working mode, the terminal may receive and play an audio digital signal transmitted through a network. That is, the terminal has a receiver function, and further has functions of receiving and processing (such as a player function) a network signal (such as a cellular network signal and a local area network signal).

It should be understood that FIG. 3*a* is merely a schematic diagram of an architecture of a communications system. A quantity of network devices 102, a quantity of access devices 105, and a quantity of terminal devices 101 in the communications system are not limited in the embodiments of this application. In addition to the network device 102, the access device 105, the map server, and the terminal device 101, a communications system to which the embodiments of this application are applicable may further include other devices such as a core network device, a wireless relay device, and a wireless backhaul device. In some scenarios, alternatively, it may be considered that the network device 102 is a special core network device. Whether the network device 102 belongs to a core network does not affect implementation of the embodiments of this application. This is not limited in the embodiments of this application. In FIG. 3*a*, the terminal device 101 may be connected to the access device 105 in a wireless manner, and establish a communication connection to the network device 102 by using the access device 105. There may be more than one terminal device 101. The terminal device 101 may be connected to the access device 105 in a wireless manner, and establish a communication connection between the terminal devices 101 by using the access device 105. Alternatively, the terminal device 101 may establish a communication connection between the terminal devices 101 in a wired manner. This is not limited herein. In the embodiments of this application, a quantity relationship between various devices is not limited. For example, a plurality of terminal devices may communicate with a same access device, or a plurality of access devices may communicate with a same network device. Communications systems to which the foregoing system architecture is applicable include but are not limited to: time division duplex-long term evolution (TDD LTE), frequency division duplex-long term evolution (FDD LTE), long term evolution-advanced (LTE-A), and various other evolved wireless communications systems, for example, a 5G NR communications system, or various wireless communications systems for evolution. In the embodiments of this application, the access device 105 may be a device that can communicate with the terminal device. For example, the access device may be any device with a wireless transceiver function, including but not limited to a base station (for example, a base station NodeB, an evolved NodeB eNodeB, a base station gNodeB in a 5G communications system, a base station or a network device in a future communications system, an access node, a wireless relay node, or a wireless backhaul node in a WiFi system), and the like. Alternatively, the access device may be a wireless controller in a cloud radio access network (CRAN) scenario. Alternatively, the access device may be a small cell, a transmission node (TRP), or the like. Certainly, this application is not limited thereto. In subsequent descriptions of the embodiments of this application, any information transmission between the terminal device 101 and the network device 102 includes a meaning that the terminal device 101 and the network device 102 implement information transmission by using the access device 105. Details are not described again in the embodiments of this application. In the embodiments of this application, the terminal device 101 is a device with a wireless transceiver function. The terminal device 101 may send a request to the network device 102, and obtain data from the network device 102. The terminal device 101 implements a positioning function by using a map module, for example, an intelligent terminal such as an unmanned vehicle or a robot, or an in-vehicle terminal configured to implement an unmanned driving function, or may be a mobile phone, a tablet computer, an in-vehicle navigation terminal, or the like.

In the embodiments of this application, the map server 106 may be a single server with relatively large storage space, or may be a server cluster formed by a plurality of servers, or may be a cloud server with ultra-large storage space. The map server is usually deployed in one or a plurality of fixed locations. As shown in FIG. 3*a*, a dashed line connection exists between the map server and the network device 102, indicating that the map server and the network device 102 may exchange data by using a core network.

The map server may store map data. Because storage space of the map server is large enough, map data within a relatively large coverage area may be stored. In the embodiments of this application, a map in the map server may include a plurality of areas, and each area is corresponding to an identifier. For example, the map may be divided into a plurality of areas based on administrative area division (for example, a district or a county). In this case, a name of each district or county may be used as an identifier of the area. In another possible implementation, the map may be divided into a plurality of regular areas by using a preset area as a unit. In this application, division may be further performed based on a coverage area of a broadcast station. The broadcast station has various types such as a national station, a provincial station, and an urban station, which separately cover different geographical areas. For example, a map is rasterized into a plurality of regular areas in a unit of 900 square meters, and a corresponding identifier is set for each area. It may be understood that the area obtained through division may alternatively be in another shape. This is not limited in the embodiments of this application.

In the embodiments of this application, the map data stored in the map server further includes map data of a broadcast signal layer. The broadcast signal layer may be a layer set based on different frequencies, or may be a layer set based on one frequency band. This is not limited herein. The map data in the broadcast signal layer may also be divided according to an area, which is described in detail below and is not described herein again.

Figure 3B:
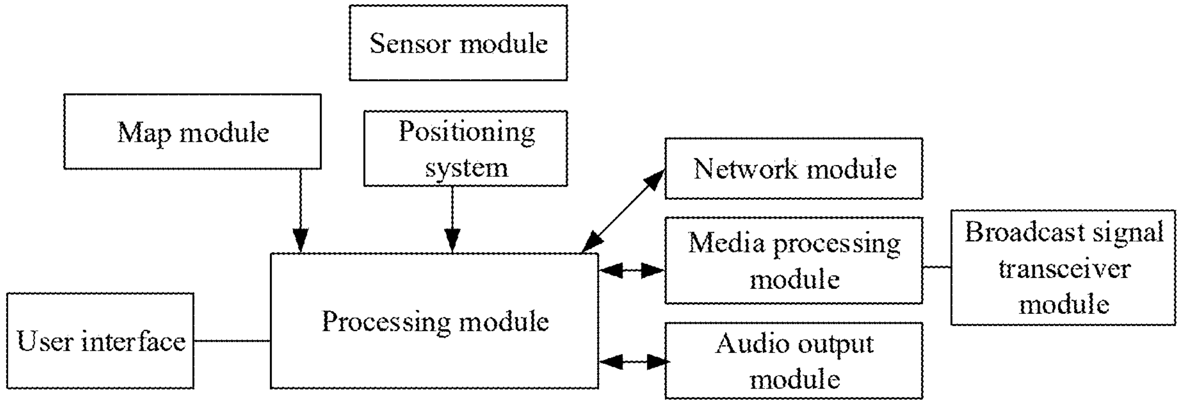
FIG. 3*b* is a schematic diagram of a structure of a multimedia terminal device according to an embodiment of this application.

As shown in FIG. 3*b*, when the terminal device 101 is an in-vehicle terminal device of a vehicle, an example of a systematic diagram of a structure of a multimedia system corresponding to the vehicle may include a user interface, a map module, a positioning system, a broadcast system, a sensor module, and the like. The broadcast system may include a broadcast signal transceiver module, a media processing module, an audio output module, a network module, a processing module, and the like. The broadcast signal transceiver module may be configured to receive FM broadcast data, detect an FM broadcast signal, and perform other functions, and may be further configured to receive network broadcast data. The media processing module may process a media stream of a broadcast signal, complete buffering of the broadcast signal, and perform voiceprint comparison on audio data in the broadcast signal, so as to determine audio content played in different broadcast signals. The audio output module is configured to play the audio stream data buffered by the media processing module for a user. The network module is configured to monitor strength of a mobile network signal, so as to determine whether to enter a coverage area of a mobile network and to determine whether network broadcast data can be received. The sensor module is configured to collect driving information of the vehicle, so as to determine information such as a speed of the vehicle, a current driving status of the vehicle, and a driving road condition of the vehicle. The processing module is configured to make a decision on switching of a broadcast signal. The processing module may be integrated with another processing module of the terminal, or may be a processing module separately disposed for the broadcast system. This is not limited herein. A specific processing process is described in detail subsequently.

In another possible implementation, the terminal device 101 may be a non-in-vehicle terminal device such as a mobile phone, and the terminal device 101 may include a user interface, a map module, and a broadcast system.

In still another possible implementation, the terminal device 101 may include a non-in-vehicle terminal device such as a mobile phone, and an in-vehicle terminal device of a vehicle. In this case, the map module and the broadcast module may be separately disposed on different terminal devices. For example, the map module may be disposed on a non-in-vehicle terminal device such as a mobile phone, and the broadcast module may be disposed on an in-vehicle terminal device of the vehicle. Alternatively, the map module may be disposed on an in-vehicle terminal device, and the broadcast module may be disposed on a non-in-vehicle terminal device. The map module and the broadcast module may establish a communication connection to a processor of the terminal device 101, so that the processor may receive map data of the map module and broadcast signal data of the broadcast module, determine whether to switch a type of a broadcast signal, and control the broadcast module to implement switching of the type of the broadcast signal.

Specific functions implemented by each module are specifically as follows:

The user interface can implement the information interaction between the multimedia system and the user. For example, when the user needs to listen to a broadcast in a travel process, the multimedia system pops up a display interface on the user interface, to prompt the user to enter, on the user interface, a broadcast station to be listened to, so as to play a signal of the broadcast station in response to an operation of the broadcast station selected by the user. The user interface may further include an interface for setting the type of the broadcast signal, so that the user can set the type of the broadcast signal. For example, the type of the broadcast signal may include FM broadcast or network broadcast. Further, the interface for setting the type of the broadcast signal may further set a scenario of the type of the broadcast signal. For example, in scenario 1, the available network traffic of the terminal meets the traffic used for network broadcast. In this case, it may be set to listen to the broadcast based on either the type of the FM broadcast signal or the type of the network broadcast signal, so that the terminal selects to play the FM broadcast when determining that the current broadcast signal is a relatively good FM broadcast signal and selects to play the network broadcast when determining that the quality of the FM broadcast signal is poor and the network broadcast signal is good. The terminal determines switching of the type of the broadcast signal, so that the user is unaware of switching of the type of the broadcast signal, thereby improving fluency of listening to a broadcast by the user in a moving process. In scenario 2, if the network traffic of the terminal is insufficient, or the terminal is in a low power consumption state, the terminal may be switched to listen to the broadcast only by using the type of the FM broadcast signal. In scenario 3, for example, when the terminal is in an area with a poor FM signal, the terminal may be switched to listen to a broadcast based on only the type of the network broadcast signal.

Further, the user interface may further display prompt information of the vehicle. For example, a type of a broadcast signal currently played by the multimedia system may be further displayed on the user interface according to a user requirement. For another example, based on a setting performed by the user on network broadcast traffic, the terminal may display prompt information for the user on the user interface when network traffic of the user meets a preset threshold, so that the user determines whether the network broadcast mode needs to be switched to the FM broadcast mode.

The positioning system may be a GPS system, a BeiDou system, or another positioning system, and may be configured to estimate a geographical location of the terminal device, or may be configured to receive location information of the terminal device that is sent by a positioning server. For example, if the terminal device 101 is an in-vehicle device, the positioning module may be disposed on a vehicle, or the positioning module is an in-vehicle device. When the positioning module is disposed on a vehicle, specifically, the positioning terminal may be disposed on the top of the vehicle, or may be disposed at another location that needs to be positioned. If the terminal device 101 is a non-in-vehicle device such as a mobile phone, the positioning module may be disposed on the non-in-vehicle device such as the mobile phone. The positioning module on the terminal device 101 may send a positioning request to the positioning server, and receive location information of the positioning module that is returned by the positioning server.

The location information of the terminal device obtained by the map module may be determined by the terminal device according to the positioning system. The positioning system may determine a positioning location of the terminal device by using a GNSS positioning method. The positioning system may further include a positioning network element in a core network. In a 5G communications system, the positioning network element may be a service capability exposure (service capability exposure function, SCEF) network element in the core network and/or a positioning server. In a possible implementation, the SCEF network element may obtain the location information of the terminal device 101 from the positioning server. The positioning server may position the terminal device by using one or more of methods such as a cell identity (Cell ID)-based positioning method, a time difference of arrival (TDOA)-based positioning method, and an angle of arrival (AOA)-based positioning method, to obtain the location information of the terminal device. Specifically, the positioning server may be an enhanced serving mobile location center (E-SMLC) network element, and/or a gateway mobile location center, or one or more network elements with a similar function. This is not limited in the embodiments of this application. It should be understood that, in the embodiments of this application, the positioning server and the network device 102 may belong to a same physical device, or may separately belong to different physical devices.

The map module may store navigation map data. Compared with a high-precision map, the navigation map provides only road-level navigation information. The navigation map may provide navigation information for a user, to meet a navigation requirement of a driving path. For example, the navigation map may provide navigation information such as a quantity of lanes on a current road, speed limit information, turning information, and route planning. In the embodiments of this application, the navigation map may further include a broadcast signal strength layer, used to provide strength information of a broadcast signal that can be received at a current geographical location.

The map module may be further configured to store lane-level road information of the high-precision map. The high-precision map may be stored in a form of a map file, and the map file of the high-precision map mainly includes geometric information and attribute information. The geometric information is spatial coordinates of the lane information, that is, a location of the lane information. The attribute information may be determined based on an attribute of a layer. For example, if the layer of the map is a lane layer, the attribute information is information about a lane information attribute, for example, whether the current lane is a main lane or an auxiliary lane, or whether the current lane is a straight lane, a right-turn lane, a left-turn lane, or another lane. If the layer of the map is a broadcast signal layer, the attribute information is strength information of the broadcast signal.

The map module may be further configured to receive map data sent by the map server. In a possible implementation, a broadcast application or a map application may be installed on the terminal device 101, so that the terminal device 101 may communicate with a back-end map server by using the broadcast application or the map application by using the Internet, to obtain map data. For example, FM signal strength layer information. Certainly, the map data in the map module may also be periodically updated. This is not limited herein. A map update manner may also be executed by the terminal or the map server. For example, in a map server update manner, strength information of a broadcast signal collected by the terminal may be sent to the map server, and the map server determines a latest range of broadcast signal strength. The map server may actively send an updated map to the terminal device, or may return, according to a query request sent by the terminal device, an updated range of broadcast signal strength corresponding to the map.

In a specific implementation process, map data of a corresponding area may be sent in a process of listening to a broadcast, so as to save map data that needs to be stored by the terminal device 101, or map data of a plurality of areas may be delivered in advance to the map server. In addition, an update manner may also be updating the map data in the map module according to a map data update requirement.

The sensor module may include several sensors that sense information about a surrounding environment of the vehicle. For example, the sensor system may include a positioning system, an inertial measurement unit (IMU), a radar, a laser rangefinder, and a camera. The IMU is configured to sense a position and an orientation change of a vehicle based on an inertial acceleration. In an embodiment, the IMU may be a combination of an accelerometer and a gyroscope. The radar can use radio signals to sense an object in a surrounding environment of the vehicle. In some embodiments, in addition to sensing an object, the radar may be further configured to sense a speed and/or a forward direction of the object. The laser rangefinder can use the laser to sense the object in the environment where the vehicle is located. In some embodiments, the laser rangefinder may include one or more laser sources, a laser scanner, one or more detectors, and other system components. The camera may be configured to capture a plurality of images of a surrounding environment of the vehicle. The camera may be a static camera or a video camera. Further, the vehicle may further include a computer vision system, which may be operated to process and analyze an image captured by a camera, so as to recognize an object and/or a feature in a surrounding environment of the vehicle. The object and/or feature may include a traffic signal, a road boundary, and an obstacle. The computer vision system may use an object recognition algorithm, a structure from motion (SFM) algorithm, video tracking, and other computer vision technologies. In some embodiments, the computer vision system may be configured to draw a map for an environment, track an object, estimate a speed of the object, and the like.

Figure 4A:
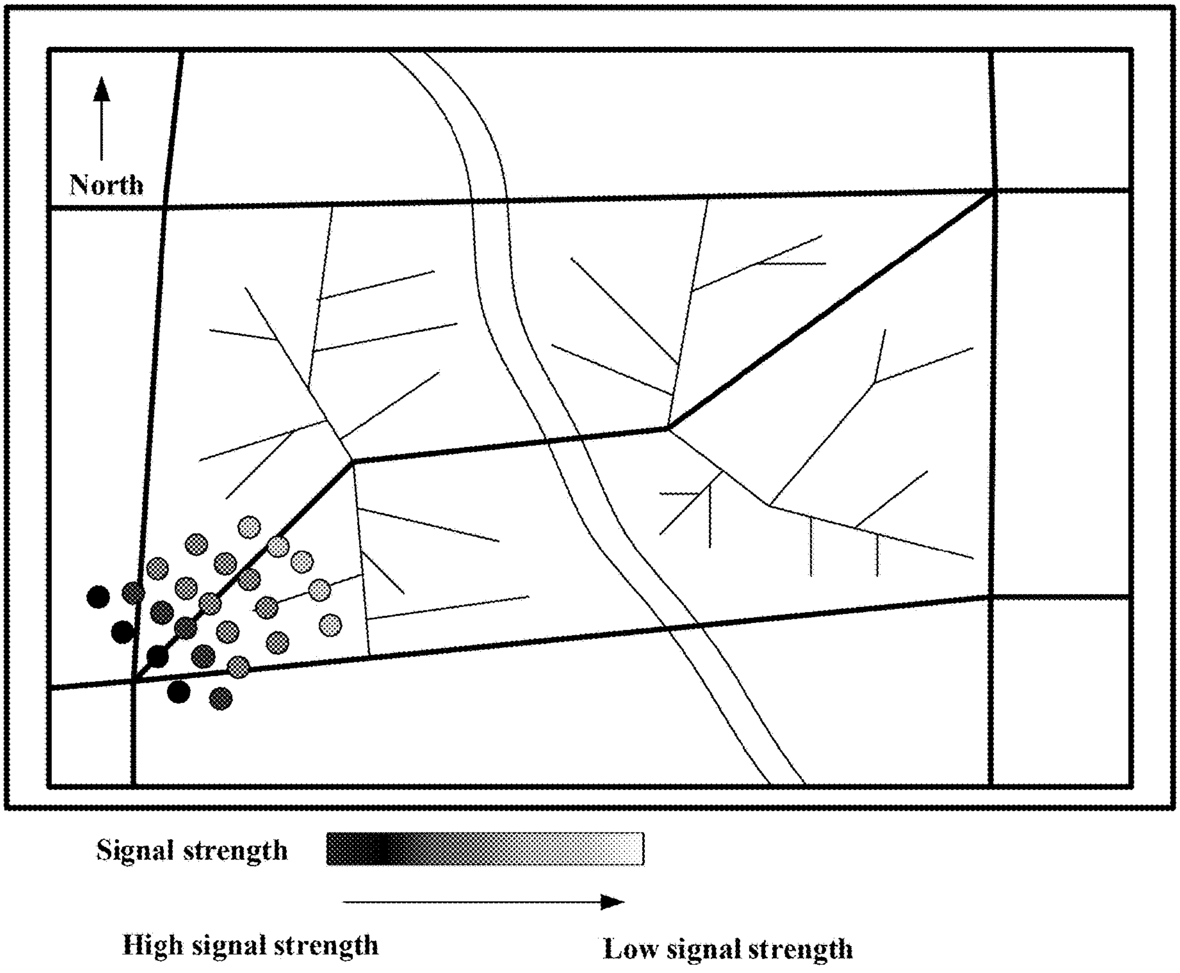
FIG. 4*a* to FIG. 4*b* are schematic diagrams of a broadcast signal strength layer according to an embodiment of this application.
Figure 4B:
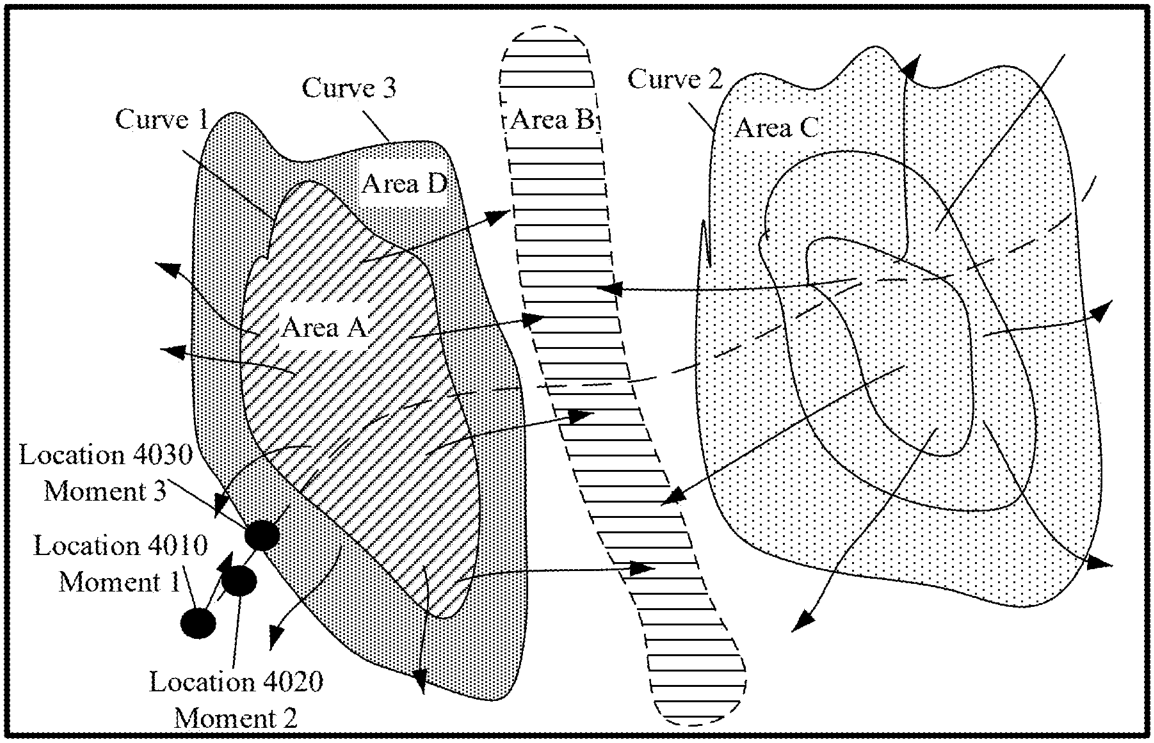

The following describes in detail a map construction method provided in the embodiments of this application. As shown in FIG. 4*a* and FIG. 4*b*, based on a conventional map, a broadcast signal strength layer is added to the map designed in the embodiments of this application, to indicate broadcast signal strength information at different locations. In a possible implementation, broadcast signal strength values at the corresponding locations may be represented by using different colors or brightness. For example, as shown in FIG. 4*a*, dots in the figure correspond to geographical locations on a map, different grayscales may be used on the dots to represent the corresponding broadcast signal strength values. A deeper color indicates stronger signal strength, and a lighter color indicates weaker signal strength.

In another possible implementation, the broadcast signal strength information is shown in FIG. 4*b* in a manner similar to a contour line in a topographic map. The broadcast signal strength layer is used to represent a first coverage range corresponding to a first strength range of a broadcast signal modulated at the first modulation frequency. The broadcast signal strength layer is further used to represent a second coverage range corresponding to a second strength range of a broadcast signal modulated at the first modulation frequency. The broadcast signal strength layer is further used to represent a third coverage range corresponding to a third strength range of a broadcast signal modulated at a second modulation frequency different from the first modulation frequency. Through the broadcast signal strength layer, a range of the broadcast signal strength of a modulation frequency at a certain location can be obtained. As shown in FIG. 4*b*, a closed irregular curve is used to represent a geographical range boundary corresponding to a broadcast signal strength range. For example, a curve 1 represents a geographical range boundary of an area A. Within the area A, the FM broadcast signal strength is greater than a first threshold, and outside the area A, the FM broadcast signal strength is less than the first threshold. On the curve 1, the FM broadcast signal strength is equal to the first threshold. Within the area A, the terminal can receive good FM broadcast signals, that is, the listening quality is good. A curve 2 represents a geographical range boundary of an area C. Within the area C, the FM broadcast signal strength is greater than a second threshold, and outside the area C, the FM broadcast signal strength is less than the second threshold. On the curve 2, the FM broadcast signal strength is equal to the second threshold. Within the area C, the terminal can receive good FM broadcast signals, that is, the listening quality is good. A curve 3 represents a geographical range boundary formed by an area D and the area A. Within the area D, the FM broadcast signal strength is greater than a third threshold, and outside the area D, the FM broadcast signal strength is less than the third threshold. On the curve 3, the FM broadcast signal strength is equal to the third threshold. The first threshold is greater than the third threshold. That is, within the area D, the strength of the FM broadcast signal received by the terminal is lower than that in the area A, and the listening quality is lower. In FIG. 4*b*, an area B formed by dashed lines represents a part of an area in which an FM broadcast signal is lower than the third threshold and the second threshold. For example, it may be indicated that in the area B, strength of the FM broadcast signal is relatively weak, and it is difficult to listen to the FM broadcast signal, or listening quality is relatively poor. According to a change trend line of the broadcast signal strength, a gradient line (for example, an arrow in FIG. 4*b*, indicating that the FM broadcast signal strength changes from strong to weak) may be further added. The broadcast signal strength layer provides a reference for switching the broadcast signal source when the terminal listens to the broadcast. For example, the vehicle is about to drive into an area with a weak FM signal or drive away from an area with a weak FM signal. A typical scenario in which an FM broadcast signal changes from strong to weak is that a mobile terminal enters a tunnel, an indoor, or the like.

Figure 5A:
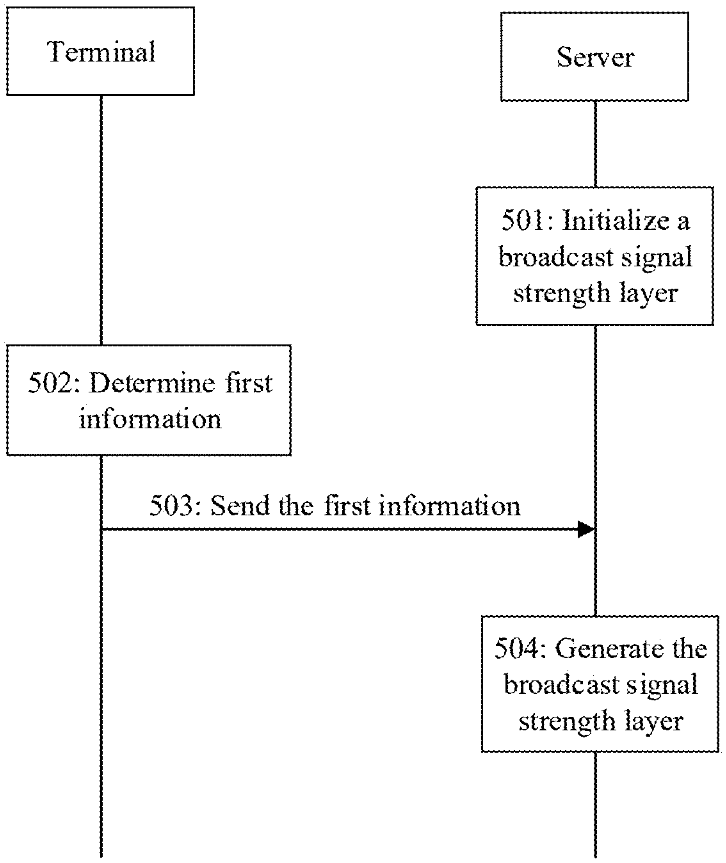
FIG. 5*a* is a flowchart of a map generation method according to an embodiment of this application.

As shown in FIG. 5*a*, specific steps of the method for generating a map including a broadcast signal strength layer provided in this application are described as follows, including: Step 501: A server executes initialization of a broadcast signal strength layer.

Using frequency modulation broadcast as an example, a coverage range corresponding to a strength range of a broadcast signal at at least one modulation frequency is initialized, and a preset coverage range corresponding to each strength range of the broadcast signal is determined.

Figure 5B:
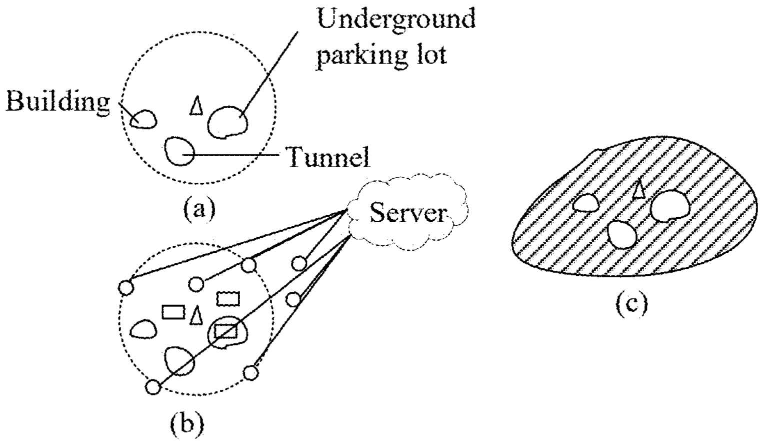
FIG. 5*b* is a schematic diagram of a process of generating a broadcast signal strength layer according to an embodiment of this application.

In a possible implementation, a boundary of the preset coverage range may be divided according to geographic information. For example, a boundary of a preset coverage range may be divided according to administrative area division. In another possible implementation, an outer boundary may be divided based on a coverage area of a broadcast station. For example, the broadcast station has various types such as a national station, a provincial station, and an urban station, which separately cover different geographical areas. In the case of a national station and a provincial station, the boundary of the preset coverage area is directly set as the national boundary and the provincial boundary. As shown in FIG. 5*b* (a), if the broadcast station is an urban station, the boundary is set to a circular curve with the city center as the center of circle and the average city radius as the radius. In still another possible implementation, the boundary of the preset coverage range may be set according to an attribute of the area, for example, tunnel or indoor information. As shown in FIG. 5*b* (a), a known weak FM signal coverage area within an area, such as a tunnel, an underground parking lot, or a building is pre-marked as a preset coverage area corresponding to a relatively weak strength range. Certainly, the boundary of the preset coverage range may alternatively be a boundary that is of the broadcast signal strength range and that is set according to another method. This is not limited herein.

Step 502: The terminal determines first information. The first information may include a positioning location of the terminal, strength of a broadcast signal modulated at a first modulation frequency and received by the terminal at the positioning location, and the first modulation frequency. Using one time of first information recorded by the terminal as an example, the first information may include but is not limited to the following content.

(1) A time for detecting strength of a broadcast signal received by the terminal at the first positioning location may be included.

(2) Detected broadcast signal strength may be included, for example, signal strength on an FM broadcast station frequency band, or signal strength on a network broadcast frequency band.

(3) FM broadcast station frequency band information, or network broadcast frequency band information may be included, for example, a band in which an FM broadcast station signal is located, or a network broadcast signal frequency point, or an IP address of a streaming media server.

(4) A first positioning location of the terminal may be included, for example, location information of a positioning location at which the terminal is located when the terminal measures broadcast signal strength, where the location information may be longitude and latitude information, or may be cell identifier information of a cellular cell, or other information that can express a location of the terminal. The information may be obtained and reported by using a global positioning system (GPS) positioning function of the terminal. The terminal may also report an identifier of a cellular cell in which the terminal is located. The server may query, according to the location information reported by the terminal, a correspondence between the corresponding location information (such as longitude and latitude or cell identifier) and a city, and obtain the area or city where the terminal is located. Different cities may have different stations, and deployment statuses of radio broadcast signal transmitters or streaming media servers thereof may also be different. Therefore, obtaining a city in which a terminal is located may be used as one of bases for determining coverage corresponding to strength of a broadcast signal at a broadcast signal layer.

(5) Motion status information of the terminal within a specified time period before and after the broadcast signal strength is measured may be included, for example, information such as a motion speed of the terminal within 5 minutes before and after the broadcast signal strength is measured. For the in-vehicle terminal, the motion status information may be obtained by using a sensor disposed on the vehicle.

(6) Environment information within a specified long time period before and after the terminal measures the broadcast signal strength may be included, for example, information such as a weather condition within a time period before and after the broadcast signal strength is measured.

When reporting, the terminal may report one or a combination of the foregoing plurality of types of information.

In a possible implementation, the terminal device may determine the first information when a positioning location changes, or strength of a broadcast signal changes, or a modulation frequency of a broadcast signal changes.

The following uses scenario a1 to scenario a3 as examples to describe scenarios in which the first information is determined.

Scenario a1: In a moving process, the terminal device continuously receives a broadcast signal. In this case, the first information may be sent to the map server based on that a change of a positioning location of the terminal device is greater than a preset distance, for example, when the change of the positioning location of the terminal device is greater than 1 m.

In this scenario, regardless of whether the modulation frequency of the broadcast signal or the strength of the broadcast signal changes, the first information may be sent to the map server, so that the map server obtains strength distributions of the broadcast signals at different locations. Certainly, to reduce network overheads occupied by the terminal to report the first information, the terminal device may send the first information to the map server when the modulation frequency of the broadcast signal changes, for example, in response to switching of a broadcast station channel by a user, when determining that the positioning location changes. Alternatively, the first information is reported to the map server only when the strength of the broadcast signal changes and the positioning location of the terminal also changes.

Scenario a2: The terminal device continuously receives a broadcast signal, and sends the first information to the map server when determining that strength of the broadcast signal changes from strong to weak or from weak to strong. Specifically, the terminal device may send the first information to the map server when a change of the strength of the broadcast signal is greater than a preset threshold.

In a possible scenario, the positioning location of the terminal device and the modulation frequency of the broadcast signal do not change, and only the strength of the broadcast signal changes. In this case, the first information reported by the terminal device may include related information of broadcast signal strength after the change, and may further include related information of broadcast signal strength before the change. For example, the terminal device receives, at the first positioning location, the first broadcast signal of the first modulation frequency. A strength value of the first broadcast signal measured by the terminal device at a first moment is the first strength value, and a strength value of the first broadcast signal measured by the terminal device at a second moment is the second strength value. In this case, the terminal device may report both the first strength value measured at the first moment and the second strength value measured at the second moment, so that the map server obtains broadcast signal strength at a same positioning location corresponding to different times.

In another possible scenario, both the positioning location of the terminal device and the strength of the broadcast signal change. In this case, the terminal device may use related information of the broadcast signal strength measured after the change as the first information, and report the first information to the map server. Alternatively, related information that is of broadcast signal strength and that is measured at a last moment before the change may be used as the first information and reported to the map server.

With reference to FIG. 4*b*, for example, the terminal device receives the first broadcast signal of the first modulation frequency at the first positioning location (for example, a location 4010), a strength value of the first broadcast signal measured by the terminal device at the first moment is the first strength value, a process in which the terminal device moves from the first positioning location (a moment 1) to the second positioning location (for example, a location 4020, a moment 2) experiences the first time period, and the measured strength value of the first broadcast signal falls within a first strength range. Within the first strength range, it may be considered that the strength range of the broadcast signal changes slightly, and may not be reported to the map server.

When the terminal device moves from the second positioning location (a moment 2) to a third positioning location (for example, a location 4030, a moment 3), the terminal device receives the first broadcast signal of the first modulation frequency, and a measured strength value of the first broadcast signal is a third strength value. For example, the terminal device determines that the broadcast signal strength increases. If the terminal device determines that a difference between the third strength value and a maximum value of the first strength range is greater than the first preset threshold, the terminal device may use related information of the broadcast signal strength measured at the moment 3 as the first information, and report the first information to the map server. Similarly, a manner in which the terminal device determines that the broadcast signal strength is weakened is used as an example. If the terminal device determines that the difference between the third strength value and a minimum value of the first strength range is greater than the second preset threshold, the terminal device may use related information of the broadcast signal strength measured at the moment 3 as the first information, and report the first information to the map server.

Considering that the second positioning location corresponding to the last moment of the first time period may be a boundary of the broadcast signal strength in the first strength range, the terminal may also use related information of the broadcast signal strength corresponding to the second positioning location at the last moment (for example, the moment 2) of the first time period as the first information, and report the first information to the map server.

Scenario a3: If determining that the modulation frequency of the broadcast signal changes, the terminal device reports the first information to the map server.

In response to the operation of switching the modulation frequency of the station by the terminal, after switching the modulation frequency, the terminal device may obtain the positioning location of the terminal, and measure the broadcast signal obtained after the modulation frequency is switched, so as to determine the strength of the broadcast signal. For example, in the case of switching from the first modulation frequency to the second modulation frequency, the strength of the broadcast signal of the second modulation frequency is measured. In addition, a positioning location of the terminal after switching the second modulation frequency may be further determined, so as to further determine the first information.

Step 503: The terminal sends the first information to the server.

In a possible implementation, the terminal device may send the first information to the map server when determining the first information. For example, the first information may be sent to the map server in a crowdsourcing mode.

In another possible implementation, the terminal may also store the first information determined each time locally in the terminal, and report, according to a specified period, a specified time, or another reporting policy (for example, when network performance is relatively good, or when the terminal is in an idle state, to avoid affecting performance of executing another event by the terminal), related information of stored broadcast signal sending changes to the server through the network at a proper time.

Step 504: After receiving the strength data and the location data, a cloud service trains a plurality of pieces of first information, to determine a coverage range corresponding to the strength range of the broadcast signal.

The plurality of pieces of first information may be a plurality of pieces of first information from one terminal, or may be a plurality of pieces of first information from a plurality of terminals. This is not limited herein. A training manner may be online training, or may be offline training. This is not limited herein. A training frequency may be determined based on a quantity of received first information, or may be determined based on a preset time.

For example, a training process may include:

Step S041: Determine training data.

To improve training efficiency, training may be performed by area based on a preset coverage range. The coverage range may be at least one coverage range corresponding to a strength range of one broadcast signal, or may be at least one coverage range corresponding to strength ranges of a plurality of broadcast signals. In this case, the first information in the preset coverage range may be determined according to the positioning location in the first information, and is used as the training data for training in the preset coverage range. In addition, training may be performed in different time segments according to the time for measuring the broadcast signal strength in the first information. Certainly, the training data may be determined based on an actual situation of the training data. This is not limited herein.

Further, to improve a training effect, priorities may be further determined for a plurality of pieces of first information according to measurement precision of the first information reported by the terminal (the measurement precision may include measurement precision of a positioning location, and may further include measurement precision of strength of a broadcast signal, which is not limited herein). Therefore, the plurality of pieces of first information are screened. For example, low, medium, and high priorities may be determined according to measurement precision of the first information reported by the terminal, and first information with a high priority is preferentially used as training data for training.

Step S042: Determine, according to the training data, coverage ranges corresponding to different strength ranges of broadcast signals.

In a possible implementation, a boundary of the first coverage range may be determined according to the plurality of positioning locations in the plurality of pieces of first information.

Specifically, a plurality of pieces of first information that are in the training data and that correspond to the strength of the broadcast signal in the first strength range may be used as a boundary of the first coverage range for determining the first strength range of the broadcast signal.

For example, it is assumed that there are 100 pieces of training data in the preset first coverage range, and there are 20 pieces of training data in the first strength range [20,30]

db. If a boundary of the first coverage range is set to 25 db, the boundary where the broadcast signal strength is 25 db may be determined according to positioning locations corresponding to the 20 pieces of training data. As shown in FIG. 5*b* (b), first information reported by a plurality of terminals (a vehicle corresponding to a circular icon in the figure is a vehicle that reports the first information, and a vehicle corresponding to a rectangular icon in the figure is a vehicle that does not report the first information) is received in the first coverage range.

In another possible implementation, the boundary of the first coverage range is determined according to a plurality of comparison results obtained by separately comparing strength that is of broadcast signals received by the terminal at the positioning locations and that is in the plurality of pieces of first information with a preset first strength threshold, and the plurality of positioning locations in the plurality of pieces of first information.

For example, assuming that there are 100 pieces of training data in a preset first coverage range, 30 pieces of training data equal to the first strength threshold are determined by separately comparing strength values of 100 broadcast signals in the 100 pieces of training data with a preset first strength threshold, the boundary of the first coverage range may be determined according to 30 positioning locations in the 30 pieces of training data, and 24 pieces of training data whose strength values are less than the first strength threshold in the 70 broadcast signals are determined according to the remaining 70 pieces of training data, and 46 pieces of training data greater than the first strength threshold, to correct the boundary of the first coverage range. As shown in FIG. 5*b* (c), a boundary may be a boundary of the first coverage range obtained after training based on the training data shown in FIG. 5*b*(b).

In the foregoing example, based on that the broadcast signal is a broadcast signal layer generated at a same modulation frequency, different broadcast signal layers may be generated for different modulation frequencies. Using the second modulation frequency as an example, the server may generate the broadcast signal strength layer according to a plurality of pieces of second information reported by the terminal. Each piece of the second information includes a positioning location of the terminal, strength of a broadcast signal that is modulated at a second modulation frequency and that is received by the terminal at the positioning location, and the second modulation frequency.

Different broadcast signal layers generated for different modulation frequencies may also be combined into one broadcast signal layer. That is, the broadcast signal strength layer may be used to represent at least one coverage range corresponding to at least one strength range of a broadcast signal modulated at the first modulation frequency, and may be further used to represent at least one coverage range corresponding to at least one strength range of a broadcast signal modulated at the second modulation frequency.

Figure 6:
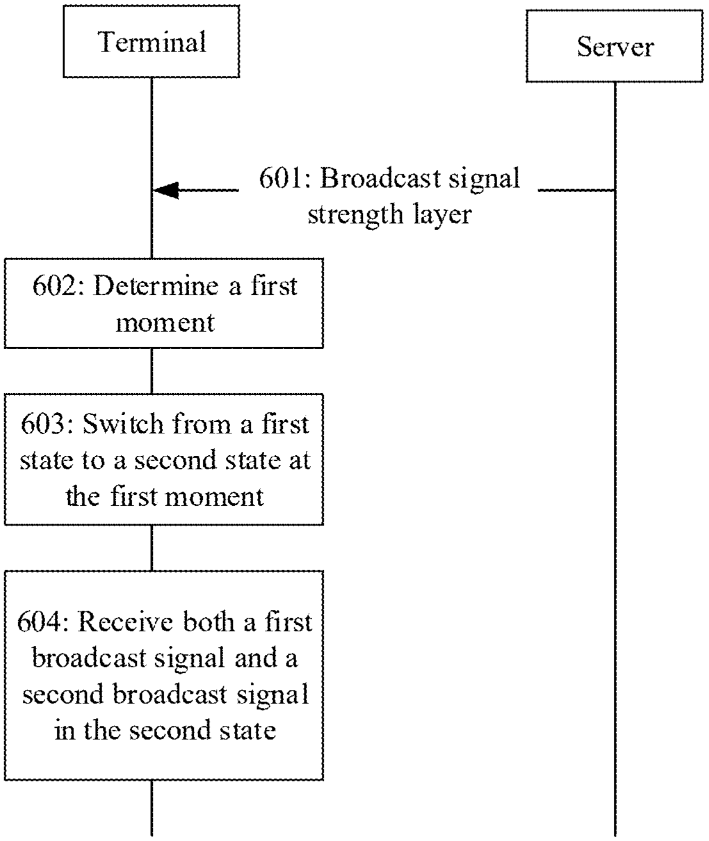
FIG. 6 is a flowchart of a first broadcast signal playback method according to an embodiment of this application.

As shown in FIG. 6, specific steps of a first broadcast signal playback method provided in this application are described as follows. For example, the terminal may collect information such as a positioning location and broadcast signal strength, and send the information to the cloud server, and the cloud server determines switching of the broadcast signal; or the terminal may determine switching of the broadcast signal. The following uses an example in which the terminal determines switching of a broadcast signal for description. A main procedure may include the following several steps.

Step 601: A terminal receives a broadcast signal strength layer from a server.

The broadcast signal strength layer is a map layer, and the broadcast signal strength layer is used to represent a coverage range of a broadcast signal corresponding to a strength level of the broadcast signal.

Step 602: Determine a first moment according to a current positioning location of the terminal, a current motion status of the terminal, a future driving path of the terminal, and the broadcast signal strength layer.

The terminal plays, before the first moment, the received first broadcast signal at a single rate when the terminal is in the first state. Using the first broadcast signal FM signal as an example, in the first state, the terminal may consider that the terminal is in a stable area of the FM signal, and for the FM signal received by the terminal, audio of the received first broadcast signal may be normally played at a 1.0× speed by using a player of the terminal.

Step 603: At the first moment, the terminal switches from a first state in which only the first broadcast signal is received to a second state in which both the first broadcast signal and the second broadcast signal are received. Types of the first broadcast signal and the second broadcast signal are different.

The current motion status of the terminal may include information such as a motion direction of the terminal, and a moving speed or an acceleration of the terminal. Therefore, the terminal may determine the future driving path of the terminal based on the current positioning location of the terminal and the current motion status of the terminal. Alternatively, the terminal may obtain the future driving path of the terminal based on the driving path planned for the terminal on the navigation map. This is not limited herein.

Figure 7A:
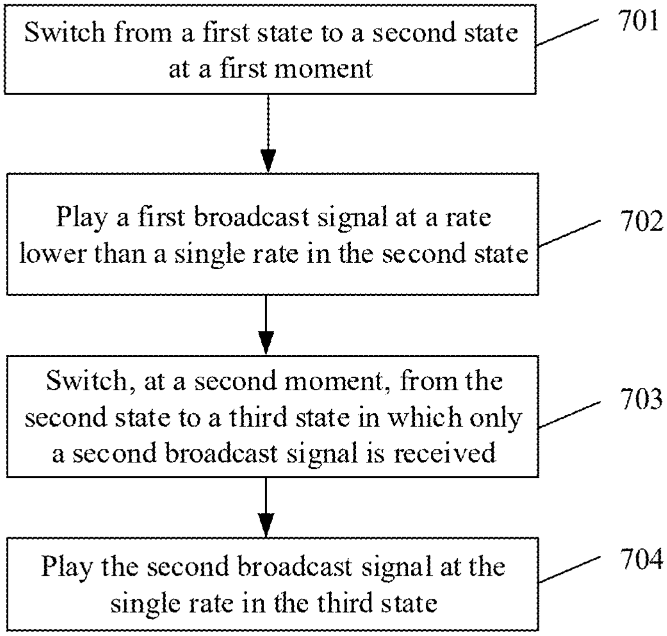
FIG. 7*a* is a flowchart of a second broadcast signal playback method according to an embodiment of this application.
Figure 7B:
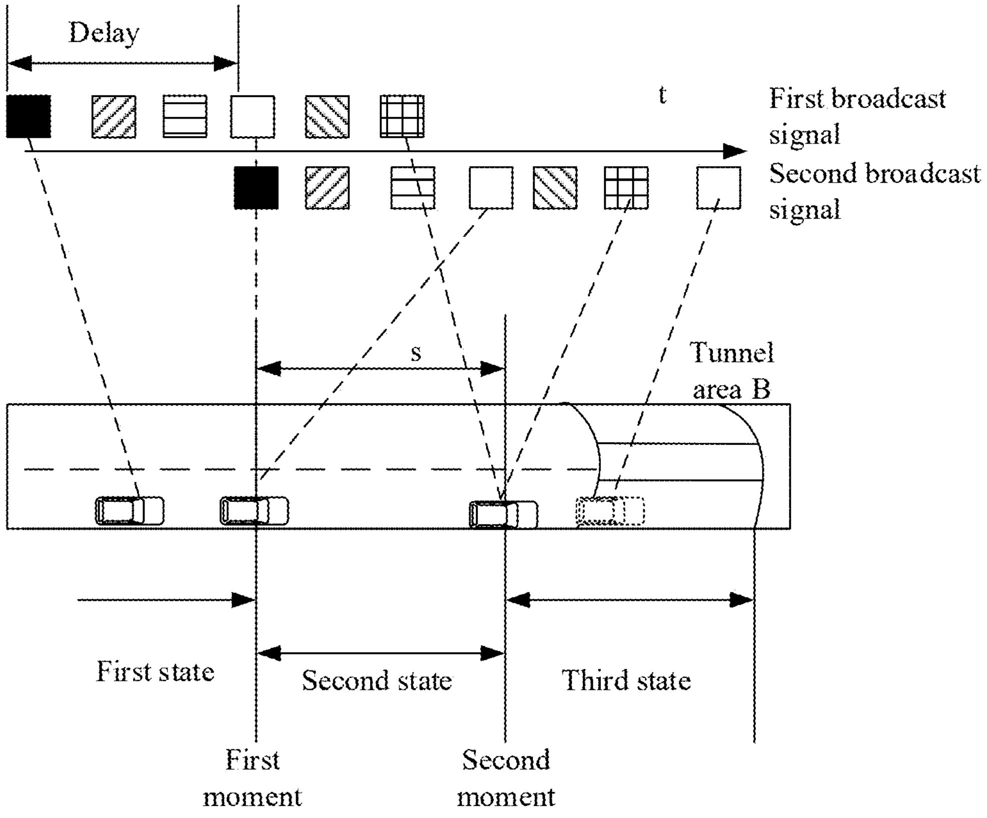
FIG. 7*b* is a schematic diagram of an application scenario of a second broadcast signal playback method according to an embodiment of this application.
Figure 7C:
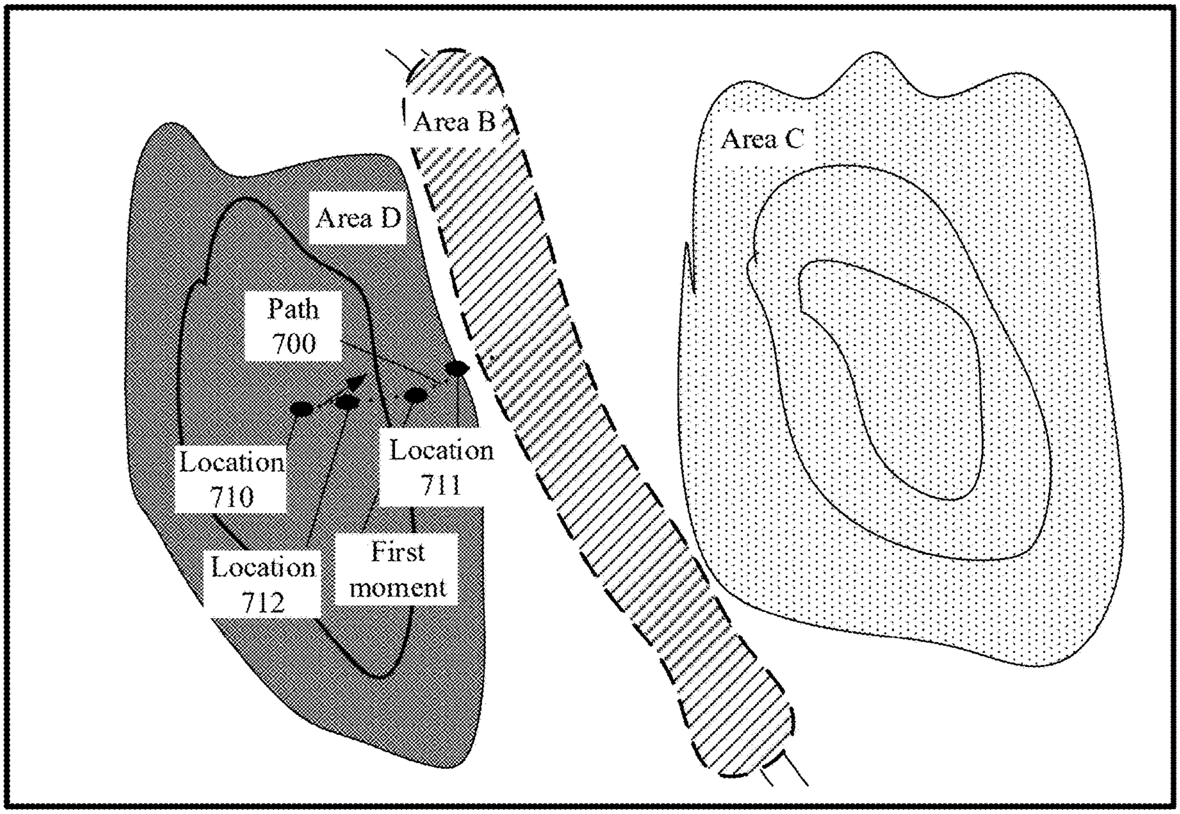
FIG. 7*c* is a schematic diagram of a broadcast signal strength layer used in a second broadcast signal playback method according to an embodiment of this application.

For example, as shown in FIG. 7*c*, the terminal is a vehicle as an example, a current positioning location of the terminal is a location 710, a current motion status of the terminal is straight-line driving, and a future driving path of the terminal is a driving path 700 shown by a dashed line, therefore, a moment at which the terminal arrives at any location on the future driving path 700 can be predicted according to motion information such as a moving speed and an acceleration of the terminal in the motion status of the terminal.

Step 604: The terminal receives the first broadcast signal and the second broadcast signal when being in the second state.

In addition, when the terminal is in the second state, the terminal may play the received first broadcast signal.

When the terminal enters the second state, considering that types of the first broadcast signal and the second broadcast signal are different, for example, an FM signal source is directly an analog signal directly transmitted by a transmit tower, and a network broadcast signal source is a broadcast signal transmitted after being forwarded by using a mobile network, playback content of the first broadcast signal is not completely synchronized with playback content of the second broadcast signal. If the first broadcast signal is directly switched to the second broadcast signal, a problem of missing listening or repeated listening occurs, and user experience is severely affected.

In a possible implementation, the terminal may insert, based on a delay between the first broadcast signal and the second broadcast signal, other audio content when playing the first broadcast signal. For example, if navigation playback still exists on the current terminal, navigation-related content may be played based on the navigation playback content when the terminal is in the second state. When the navigation-related content is played, playback of the first broadcast signal may be paused. When it is determined that the first broadcast signal and the second broadcast signal play the same content at a same moment, the time point may be used as a time point for playing the second broadcast signal. This is to complete switching from the first broadcast signal to the second broadcast signal.

For example, with reference to FIG. 7*b*, when the first moment arrives, a received audio frame of the first broadcast signal is a white block in FIG. 7*b*, and a received audio frame of the second broadcast signal is a black block in FIG. 7*b*. If the playback is at a single rate, a moment at which the audio frame played by the second broadcast signal is a white block may be represented as an initial moment. Therefore, the delay between the first broadcast signal and the second broadcast signal may be determined according to the initial moment and the first moment, and the delay ΔT meets:

$$\Delta T = T(\text{initial moment}) - T(\text{first moment}).$$

In this case, audio content whose length is the same as the delay may be inserted into a time window. A time point at which the audio content is completely played may be used as a time point for switching to the second broadcast signal. Certainly, a time point at which the time window ends may be used as a time point for switching to the second broadcast signal. This is not limited herein.

In another possible implementation, in this application, the terminal may play the first broadcast signal in a non-single rate playback manner, so that the first broadcast signal is played at a variable speed within the time window, and therefore the audio frame played by the first broadcast signal is synchronized with the received audio frame of the second broadcast signal after the variable speed playback ends, so as to implement seamless switching between the first broadcast signal and the second broadcast signal, and improve listening experience of the user.

With reference to the broadcast signal strength layer, a manner in which the terminal switches from the first state to the second state at the first moment, to finally switch the broadcast signal may be determined based on different scenarios. The following uses specific scenarios b1 and b2 as examples for description.

In the scenario b1 and the scenario b2, it is considered that the network broadcast signal needs to consume network traffic, and when the FM broadcast signal is relatively weak, the network broadcast signal can meet a broadcast playback requirement. Therefore, a switching policy is mainly described based on a policy in which an FM broadcast signal is preferentially selected when a signal of an FM broadcast station is good.

In the scenario b1, when the FM broadcast signal is relatively weak, the FM broadcast signal needs to be switched to the network broadcast signal.

An example in which the terminal currently plays the first broadcast signal and the terminal switches from a scenario in which the first broadcast signal is relatively strong to a scenario in which the first broadcast signal is relatively weak is used below for description. FIG. 7*a* is a schematic flowchart of a second broadcast signal playback method according to this application. For example, when a vehicle enters an area with a relatively poor FM signal from an area with a stable FM signal (for example, entering a tunnel or a parking lot), the FM signal needs to be switched to a network broadcast signal. The following steps may be included.

Step 701: A terminal switches from a first state to a second state at a first moment.

In this case, the terminal determines that the first moment needs to meet the following conditions: The terminal is to enter an area with a weak FM signal, and network broadcast signals in the current area and a predicted future driving area are strong.

In this scenario, the terminal needs to switch from receiving FM broadcast signals to receiving network broadcast signals. As shown in FIG. 7*b* and FIG. 7*c*, an area in which an FM broadcast signal is weak is a tunnel area (an area B includes a tunnel). In this case, the first broadcast signal may be an FM broadcast signal, and the second broadcast signal may be a network broadcast signal. When the terminal is in the first state, FM broadcast signal strength is high, and the terminal may receive only the FM broadcast signal, and play the received FM broadcast signal. When the terminal enters the tunnel, FM broadcast signal strength is low. That is, as shown in FIG. 7*b*, when the terminal is in a third state, the terminal may receive only a network broadcast signal, and play the received network broadcast signal. If the first state is directly switched to the third state, because there is a delay between the FM broadcast and the network broadcast (the FM broadcast is "faster" than the network broadcast), when playback of the FM signal is directly switched to playback of the network broadcast signal, a user repeatedly listens to a broadcast. In this application, to ensure switching quality and improve user experience, the second state is added between the first state and the third state. When being in the second state, the terminal continues to receive the FM broadcast signal, plays the FM broadcast signal at a rate lower than a single rate by buffering the received FM broadcast signal, and receives and buffers the network broadcast signal at the same time. When the second state ends, the currently played FM broadcast signal is synchronized with the currently received network broadcast signal, and then the second state is switched to the third state in which only the network broadcast signal is received and played, thereby implementing seamless switching and improving listening experience of the user.

To implement the foregoing solution, a time window corresponding to the second state needs to be set for the terminal. A start moment of the time window is the first moment, and an end moment is a second moment.

The first moment and the second moment may be determined based on a strength layer of a broadcast signal. As shown in FIG. 7*c*, a current positioning location of the terminal is a location 710, and a dashed line represents a possible future driving path 700 of the terminal. Broadcast signal strength at a location 711 is equal to a first switching threshold. In a first coverage range (for example, an area D) formed by the location 711, FM signal strength is higher than the first switching threshold. When the terminal leaves the first coverage range and enters an area B, the FM signal is relatively weak and needs to be switched to the network broadcast signal. Therefore, the location 711 may be determined as a critical point location at which the broadcast signal needs to be switched (that is, a location point at which the second state is switched to the third state, and a moment at which the vehicle moves to the location point is the first moment). Therefore, on one hand, the first moment at which the vehicle moves to the location point 711 is predicted according to the current motion status of the vehicle, the current positioning information, and the map information. On the other hand, a time length of the time window corresponding to the second state is determined according to a time hysteresis between the two types of broadcast signals and the low playback rate of the FM broadcast signal, the time length of the time window is sufficient to synchronize the played FM broadcast signal with the received network broadcast signal, and further, a start moment (that is, a time point at which the first state is switched to the second state, that is, the first moment) of the time window is determined according to the first moment and the time length of the time window.

It should be noted that the terminal may determine the time hysteresis between the two types of broadcast signals by comparing voiceprints of the received FM broadcast signal and the network broadcast signal. As shown in FIG. 7*b*, the terminal receives a frame (an uplink white block in FIG. 7*b*) of the first broadcast signal at the first moment (for example, a moment 1), and receives, at an initial moment (for example, a moment 2), a frame (a downlink white block in FIG. 7*b*) that is of the second broadcast signal and that has same content as the frame. It may be determined that a time difference between the first broadcast signal and the second broadcast signal is (the moment 1-the moment 2). In this case, when playing the first broadcast signal in the second state, the terminal may insert another audio signal whose time length is the time difference, or slowly play the first broadcast signal, so that when the terminal arrives at the second moment, an audio frame (for example, an uplink grid pattern block in FIG. 7*b*) played by the first broadcast signal is synchronized with a received audio frame (for example, a downlink grid pattern block in FIG. 7*b*) of the second broadcast signal. A specific implementation is described in detail below, and details are not described herein again.

Figure 7D:
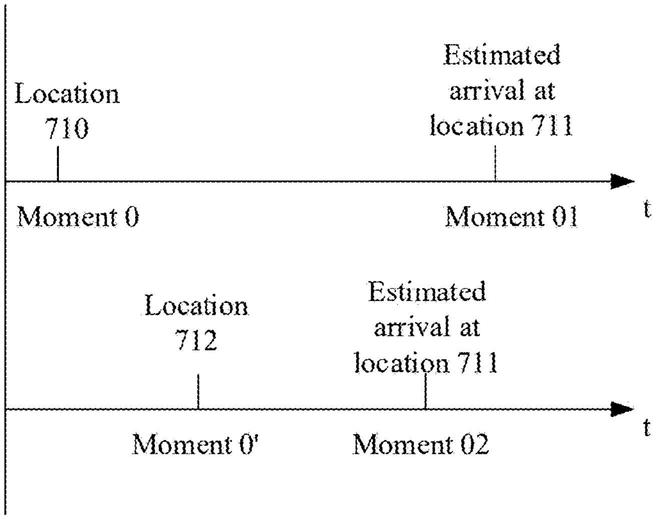
FIG. 7*d* is a schematic diagram of a second broadcast signal playback method according to an embodiment of this application.

Considering that the second moment at which the terminal arrives at the location 711 is determined based on the moving speed of the terminal, and the moving speed may change in a moving process, the determined second moment may change in the moving process of the terminal, for example, when the terminal moves from the location 710 to the location 712. For example, as shown in FIG. 7*d*, at the location 710, a moment of arrival at the location 711 predicted based on the location 710 corresponding to the moment 0 is a moment 01. When the terminal arrives at the location 712, this moment is a moment 0'. Because a moving speed of the terminal accelerates, it is predicted that a moment at which the terminal arrives at the location 711 is a moment 02, and the moment 02 is earlier than the moment 01. In this case, the terminal needs to re-determine the first moment based on the window length of the time window and the second moment (the moment 02), that is, the first moment determined in this case is earlier than the first moment determined at the location 710.

In another possible scenario, considering that in a moving process of the terminal, a scenario such as a traffic jam or a plurality of traffic lights may occur, in this case, a moment at which the terminal actually arrives at the location 711 is far later than the second moment (the moment 01) predicted at the location 710, as a result, entering the third state too early may be caused, or entering the second state too early may be caused, causing unnecessary waste and even affecting smooth switching.

Based on the foregoing consideration, in a possible implementation, the second moment may be updated in real time based on the positioning location and the motion status of the terminal, so as to update the first moment based on the updated second moment.

To avoid frequently updating the first moment, in another possible implementation, in the foregoing solution of determining the second moment, minimum duration used for moving the terminal from the location 710 to the location 711 may be further determined based on a road speed limiting rule; or, maximum duration when the terminal moves from the location 710 to the location 711 is considered, so that an appropriate time window length is determined through comprehensive consideration, to determine the first moment, and prevent the terminal from entering the second state too early or too late.

Step 702: When being in the second state, the terminal receives and buffers a first broadcast signal and a second broadcast signal, and plays the first broadcast signal at a rate lower than the single rate.

The second broadcast signal has a delay relative to the first broadcast signal.

For example, with reference to FIG. 7*b*, in the time window, a variable speed of playback lower than the single rate is 0.x. 0.x may be set to be slightly less than 1.0 and within a user-insensitive range (for example, a variable speed of playback may be set to a media speed change within ±12%). Alternatively, the variable speed may be preset by the user.

In step 702, the terminal may compare an audio voiceprint of the first broadcast signal currently played by a player with a received audio voiceprint of the network broadcast, and when determining that the currently played audio frame of the first broadcast signal and the received audio frame of the network broadcast have same content, determine that the first broadcast signal is synchronized with the second broadcast signal. In this case, receiving of the first broadcast signal may be synchronized with receiving of the second broadcast signal after the first broadcast signal is played at a lower rate than the single rate. This is referred to as first synchronization. It is determined that a first synchronization moment may be used as the second moment.

A delay time difference of a network broadcast audio relative to an FM audio is Δt1; duration of the time window (from the first moment to the second moment) is Δt2, and within the time window, a time for playing the first broadcast signal at a low speed from the first moment to the synchronization time point is Δt2. In this case, a time difference between a time of slow playback by the first broadcast signal player and a time of normal playback satisfies:

$$(1-0.x)\times\Delta t2.$$

The time difference is equal to the delay Δt1, that is, the following formula is satisfied:

$$\Delta t1=(1-0.x)\times\Delta t2.$$

In a possible implementation, a minimum value of the time window may be determined based on an average speed of the vehicle within the time of the time window. The average speed of the terminal in the time window may be estimated based on map information by using a vehicle condition, a road condition, and a traffic rule. For example, if the average speed is v, a minimum distance s corresponding to the minimum time window needs to satisfy the following formula:

$$s=\Delta t2\times v.$$

Therefore, it may be determined that s satisfies the following formula:

$$s=(\Delta t1/(1-0.x))\times v.$$

As shown in FIG. 7*b*, the second location that is determined based on the broadcast signal strength layer and that is corresponding to the second moment is determined. The location is a location that needs to be completely switched to a location at which a network broadcast signal is received. Otherwise, a broadcast playback effect is affected. Further, the first moment (corresponding to the first location) may be determined based on the determined minimum distance s, so as to ensure that an occasion for the user to enter the second state can satisfy that the first synchronization moment is not too early or too late relative to the second moment, thereby ensuring relatively good user experience and a relatively low cost of listening to a broadcast.

Step 703: The terminal switches, at the second moment, from the second state to a third state in which only the second broadcast signal is received.

When the second moment arrives, the audio frame of the first broadcast signal currently played by the player is completely synchronized with the received audio frame of the second broadcast signal. In this case, receiving of the FM signal may be stopped, only the second broadcast signal is received, and the received second broadcast signal is normally played.

Step 704: The terminal plays the second broadcast signal at the single rate when being in the third state.

In the third state, the network broadcast signal is played at the single rate, so as to complete a switching process.

Scenario b2: When the FM broadcast signal changes from weak to strong, the network broadcast signal needs to be switched to the FM broadcast signal.

Figure 8A:
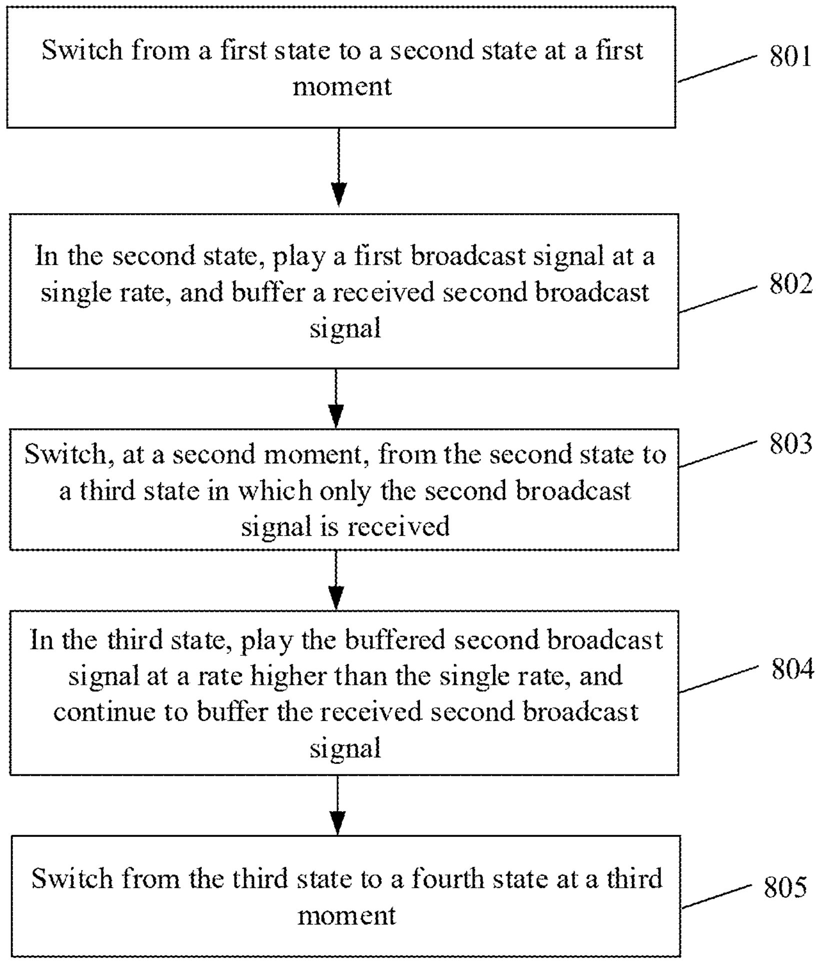
FIG. 8*a* is a flowchart of a third broadcast signal playback method according to an embodiment of this application.
Figure 8B:
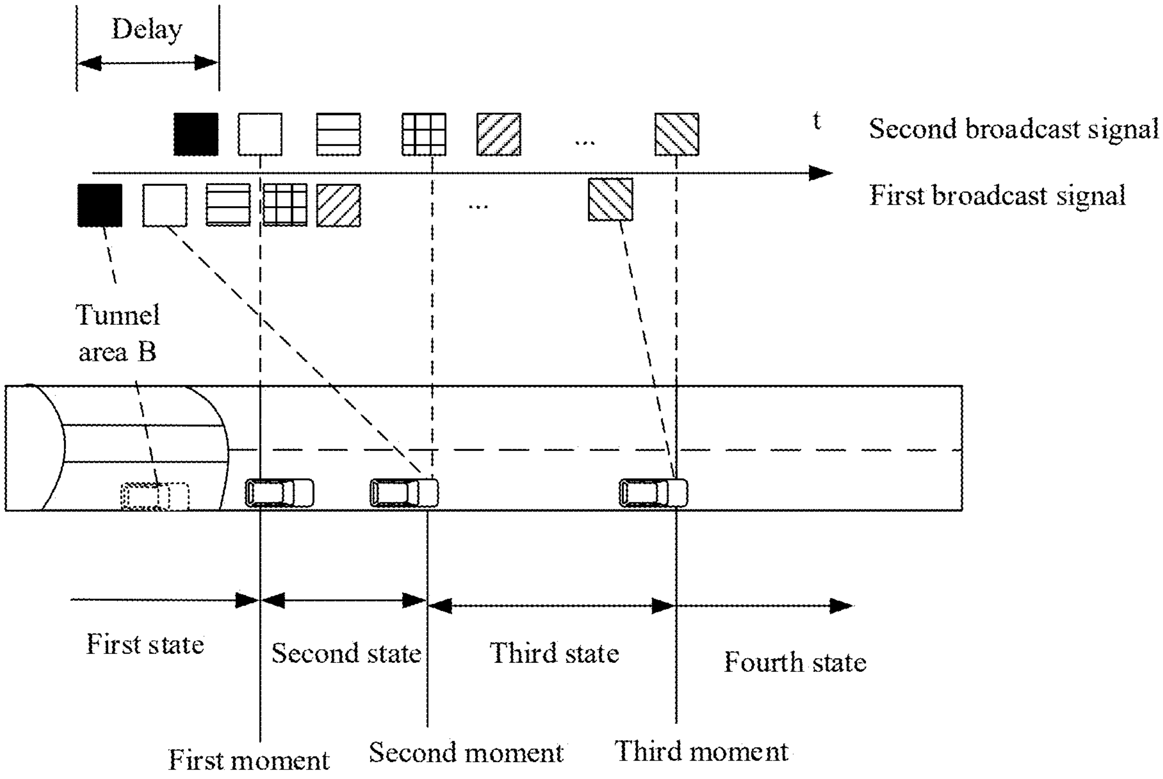
FIG. 8*b* is a schematic diagram of an application scenario of a third broadcast signal playback method according to an embodiment of this application.

The following uses an example in which the terminal currently plays the second broadcast signal, the terminal switches from a scenario in which the first broadcast signal is relatively weak to a scenario in which the first broadcast signal is relatively strong, and the second broadcast signal has a delay relative to the first broadcast signal (the FM broadcast needs to be "faster" than the network broadcast) for description. For example, in an area with a weak FM signal, the terminal may receive only a network broadcast signal, and during this period, the player normally plays the received network broadcast audio at a 1.0x speed. For example, when a vehicle moves away from an area with a relatively poor FM signal (for example, leaving a tunnel or a parking lot) and enters an area with a stable FM signal, a signal source may be switched from a network broadcast signal to an FM broadcast signal. If playing the received network broadcast signal (corresponding to the first state in FIG. 8*b*) is directly switched to playing the received FM broadcast signal (corresponding to the fourth state in FIG. 8*b*), because there is a delay between the FM broadcast and the network broadcast, the user misses a broadcast, and an obvious sense of truncation occurs, resulting in poor user experience. In this application, to ensure switching quality and improve user experience, as shown in FIG. 8*b*, the second state and the third state are added between the first state and the fourth state. When the terminal is in the second state, the received network broadcast signal continues to be played, and the FM broadcast signal is received and buffered until the played network broadcast signal and the FM broadcast signal received when the second state is initial are the same content (second synchronization), the second state ends, and the terminal switches to the third state. In the third state, the terminal no longer receives the network broadcast signal, only continues to receive and buffers an FM broadcast signal, and plays, at a rate higher than a single rate, the network broadcast signal buffered since the start moment of the second state, and switches from the third state to the fourth state in which only the network broadcast signal is received and played at a normal single rate until the currently played buffered network broadcast signal and the currently received network broadcast signal are the same content (third synchronization), thereby implementing seamless switching and improving listening experience of the user. FIG. 8*a* is a schematic flowchart of a second broadcast signal playback method according to this application. Specific steps may include:

Step 801: A terminal switches from a first state to a second state at a first moment.

In this case, the terminal determines that the following condition needs to be met at the first moment: entering, from an area with a weak FM signal, an area with a strong FM signal.

In the scenario b2, for example, the first broadcast signal is a broadcast signal broadcasted by a network, and the second broadcast signal is an FM broadcast signal. In this case, based on strength distribution of the second broadcast signal in the broadcast signal strength layer and a predicted future driving path, it is determined that the terminal arrives at a third location at which strength of the second broadcast signal is greater than or equal to the second switching threshold, so as to determine the first moment.

Figure 8C:
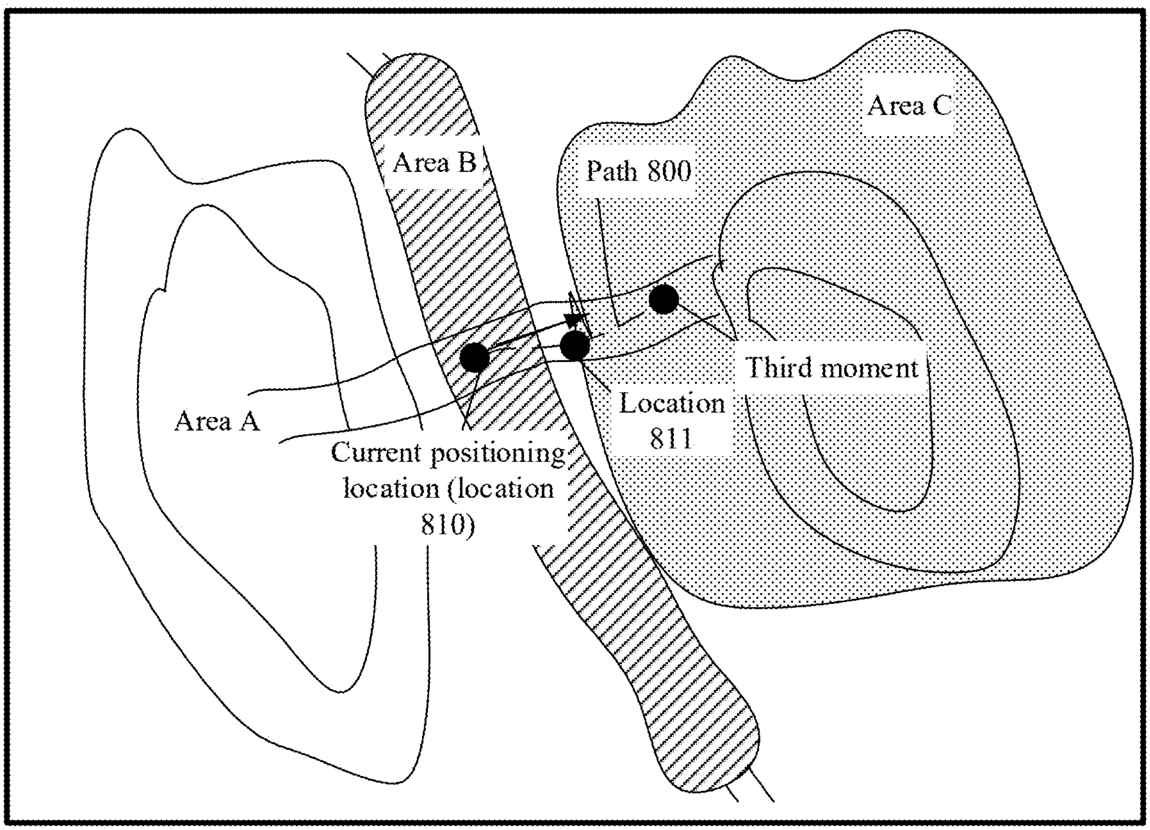
FIG. 8*c* is a schematic diagram of a broadcast signal strength layer used in a third broadcast signal playback method according to an embodiment of this application.

As shown in FIG. 8*b* and FIG. 8*c*, when the terminal is in the first state, the terminal is located in an area B, that is, strength of an FM broadcast signal received by the terminal is relatively weak. For example, a current location of the terminal is a location 810, the location is in the first coverage range (the area B), and the FM signal strength is lower than the first switching threshold. In this case, the terminal plays the broadcast by using the network broadcast signal. After the terminal leaves the first coverage range (the area B), that is, after the terminal leaves the tunnel, the FM broadcast signal strength becomes stronger. For example, after reaching a third location at which the strength of the second broadcast signal is greater than or equal to the second switching threshold, the terminal may switch to the second state, and prepare to switch from the network broadcast signal to the FM broadcast signal. For example, the current positioning location of the terminal is the location 810. Based on that strength of the second broadcast signal is a boundary of the first coverage area (an area C) corresponding to the second switching threshold and the predicted future driving path 800 of the terminal, the an intersection point between the driving path and the area C is determined as the location 811. Therefore, the location 811 may be determined as a critical point location of a to-be-switched broadcast signal (that is, a location point at which the first state is switched to the second state, and a moment at which the vehicle moves to the location point is the first moment). Therefore, the first moment corresponding to the location 811 is determined. In a possible implementation, the first moment corresponding to the third location may be determined according to a predicted moment at which the terminal arrives at any location on the future driving path. For example, the first moment at which the terminal arrives at the location 811 may be predicted based on factors such as the location 810 obtained through positioning, the location 811 on the broadcast signal strength layer, the motion status of the terminal, the road condition, and the future driving path of the terminal.

Step 802: The terminal plays the first broadcast signal at the single rate when being in the second state, and buffers the received second broadcast signal.

At the first moment when the terminal arrives at the location 811, the terminal may enter the second state of simultaneously receiving the first broadcast signal and the second broadcast signal. In this case, strength of the second broadcast signal may meet a playback requirement.

Determine, based on a time hysteresis between the first broadcast signal and the second broadcast signal, a time length of a time window corresponding to the second state, so that the time length is sufficient to enable content of a frame in the first broadcast signal played when the second state ends to be the same as content of a frame in the buffered second broadcast signal. For example, if the time length of the time window corresponding to the second state is set to be equal to the time hysteresis, the first broadcast signal played when the second state ends and the second broadcast signal buffered at the start moment of the second state are same broadcast content.

With reference to FIG. 8*b*, when the terminal enters the second state, the terminal simultaneously receives an FM broadcast signal and a network broadcast signal. A player normally plays an audio of the received network broadcast signal at a speed of 1.0x, and buffers the audio of the received FM broadcast signal. In the second state, the terminal may compare an audio voiceprint of the first broadcast signal currently played by the player with a buffered audio voiceprint of the second broadcast, and determine, when determining an audio frame (a white block in FIG. 8*b*) of the first broadcast signal currently played is the same content (a white block in FIG. 8*b*) as that of the buffered audio frame of the network broadcast, that the first broadcast signal is synchronized with the second broadcast signal. In this case, the played first broadcast signal may be synchronized with the initially buffered second broadcast signal. This is referred to as second synchronization. It is determined that a moment of the second synchronization may be used as the second moment in this scenario.

Step 803: The terminal switches, at the second moment, from the second state to a third state in which only the second broadcast signal is received.

When the second synchronization moment arrives, it is determined that the terminal enters the third state. In this case, the terminal may stop receiving the network broadcast signal.

Step 804: When being in the third state, the terminal plays the buffered second broadcast signal at a rate higher than a single rate, and continues to buffer the received second broadcast signal.

In the third state, the broadcast player of the terminal plays the FM audio at a speed of (1+0.x). Until the buffered FM audio is played. The terminal may compare the audio voiceprint of the first broadcast signal currently played by the player with the received audio voiceprint of the network broadcast, and determine, when determining that the currently played audio frame of the first broadcast signal and the received audio frame of the network broadcast have same content, that the first broadcast signal and the second broadcast signal reach a third synchronization, where a moment of the third synchronization is the third moment. With reference to FIG. 8*b*, the buffered audio content from the white block to the left twill block is quickly played, so that when the third moment arrives, the received second broadcast signal (the left twill block in FIG. 8*b*) and the currently played second broadcast signal (the left twill block in FIG. 8*b*) are synchronized.

Step 805: The terminal switches from the third state to a fourth state at the third moment.

The terminal plays the received second broadcast signal at the single rate in the fourth state. So far, the switching process is complete.

With reference to the accompanying drawings, the following describes apparatuses configured to implement the foregoing methods in embodiments of this application. Therefore, all the foregoing content may be used in the following embodiments. Repeated content is not described again.

Figure 9:
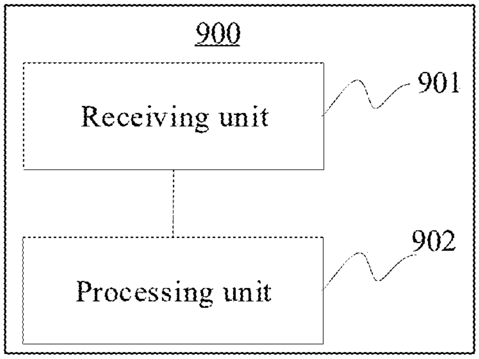
FIG. 9 is a schematic diagram of a structure of a first map generation apparatus according to an embodiment of this application.

FIG. 9 is a block diagram of a structure of a map generation apparatus 900 according to an embodiment of this application. For example, the map generation apparatus 900 is, for example, a map server. The map generation apparatus 900 includes a receiving unit 901 and a processing unit 902. Alternatively, the receiving unit 901 and the processing unit 902 may be two apparatuses independent of each other. Both the receiving unit 901 and the processing unit 902 are carried in a map server. The receiving unit 901 may be a communications unit in the map server, and the processing unit 902 may be a processing unit in the map server, the receiving unit 901 and the processing unit 902 may communicate with each other in a wired manner or a wireless manner.

For example, the map generation apparatus 900 may be a map server. For example, the map generation apparatus 900 may be a chip applied to the map server, or may be a composite device or component that has a map generation function in the terminal apparatus, or may be another composite device or component that has a map generation function. When the map generation apparatus 900 is a map server, the receiving unit 901 may be a transceiver, and may include an antenna, a radio frequency circuit, and the like, or may be an interface circuit coupled to a processor. The processing unit 902 may be a processor, for example, a baseband processor, and the baseband processor may include one or more central processing units (CPU). When the map generation apparatus 900 is a component with a terminal function, the receiving unit 901 may be a radio frequency unit, and the processing unit 902 may be a processor, for example, a baseband processor. When the map generation apparatus 900 is a chip system, the receiving unit 901 may be an input/output interface of the chip system (for example, a baseband chip), and a determining unit may be a processor of the chip system, and may include one or more central processing modules.

The processing unit 902 may be configured to perform all operations other than sending and receiving operations performed by the server in the embodiment shown in FIG. 5*a*, and/or configured to support another process of the technology described in this specification. The receiving unit 901 may be configured to perform all obtaining operations performed by the server in the embodiment shown in FIG. 5*a*, and/or configured to support another process of the technology described in this specification.

In addition, the receiving unit 901 may be a function module, and the function module can complete both a sending operation and a receiving operation. For example, the receiving unit 901 is a module included in the map generation apparatus 900, and the receiving unit 901 may be configured to perform all sending operations and receiving operations performed by the server in the embodiment shown in FIG. 5*a*. For example, when a sending operation is performed, it may be considered that the receiving unit 901 is a sending module, and when a receiving operation is performed, it may be considered that the receiving unit 901 is a receiving module. Alternatively, the receiving unit 901 may be a general term of two function modules. The two function modules are respectively a sending module and a receiving module, and the sending module is configured to complete a sending operation. For example, if the receiving unit 901 is a module included in the server, the sending module may be configured to perform all sending operations performed by the server in the embodiment shown in FIG. 5*a*, and the receiving module is configured to complete a receiving operation. For example, if the receiving unit 901 is a module included in the server, the receiving module may be configured to perform all receiving operations performed by the server in the embodiment shown in FIG. 5*a*.

The receiving unit 901 is configured to receive a plurality of pieces of first information, where each piece of the first information includes a positioning location of a terminal, strength of a broadcast signal modulated at a first modulation frequency and received by the terminal at the positioning location, and the first modulation frequency. The processing unit 902 is configured to generate a broadcast signal strength layer according to the plurality of pieces of first information, where the broadcast signal strength layer is used to represent a first coverage range corresponding to a first strength range of a broadcast signal modulated at the first modulation frequency.

In a possible implementation, the processing unit 902 is specifically configured to determine a boundary of the first coverage range according to a plurality of positioning locations in the plurality of pieces of first information.

In a possible implementation, the processing unit 902 is specifically configured to determine the boundary of the first coverage range according to a plurality of comparison results obtained by separately comparing strength that is of broadcast signals received by the terminal at the positioning locations and that is in the plurality of pieces of first information with a preset first strength threshold, and the plurality of positioning locations in the plurality of pieces of first information.

In a possible implementation, the broadcast signal strength layer is further used to represent a second coverage range corresponding to a second strength range of a broadcast signal modulated at the first modulation frequency.

In a possible implementation, the receiving unit 901 is further configured to receive a plurality of pieces of second information, where each piece of the second information includes a positioning location of a terminal, strength of a broadcast signal modulated at a second modulation frequency and received by the terminal at the positioning location, and the second modulation frequency. The processing unit is further configured to generate the broadcast signal strength layer according the plurality of pieces of second information, where the broadcast signal strength layer is further used to represent at least one coverage range corresponding to at least one strength range of a broadcast signal modulated at the second modulation frequency.

In a possible implementation, the processing unit 902 is further configured to preset, according to a modulation frequency of a broadcast signal and geographic information, the at least one coverage range corresponding to the at least one strength range, and generate the broadcast signal strength layer based on the at least one preset coverage range corresponding to the at least one strength range by training data in the plurality of pieces of first information, where the plurality of pieces of first information are from a plurality of terminals.

In the embodiments of this application, the unit division is an example, and is merely logical function division and may be another division manner in actual implementation. In addition, the functional units in the embodiments of this application may be integrated into one processor, or each of the units may exist alone physically, or two or more units may be integrated into one unit. The integrated unit may be implemented in a form of hardware, or may be implemented in a form of a software function unit.

Only one or more of the units in FIG. 9 may be implemented by software, hardware, firmware, or a combination thereof. The software or firmware includes but is not limited to a computer program instruction or code, and may be executed by a hardware processor. The hardware includes but is not limited to various integrated circuits, such as a central processing unit (CPU), a digital signal processor (DSP), a field programmable gate array (FPGA), or an application-specific integrated circuit (ASIC).

Figure 10:
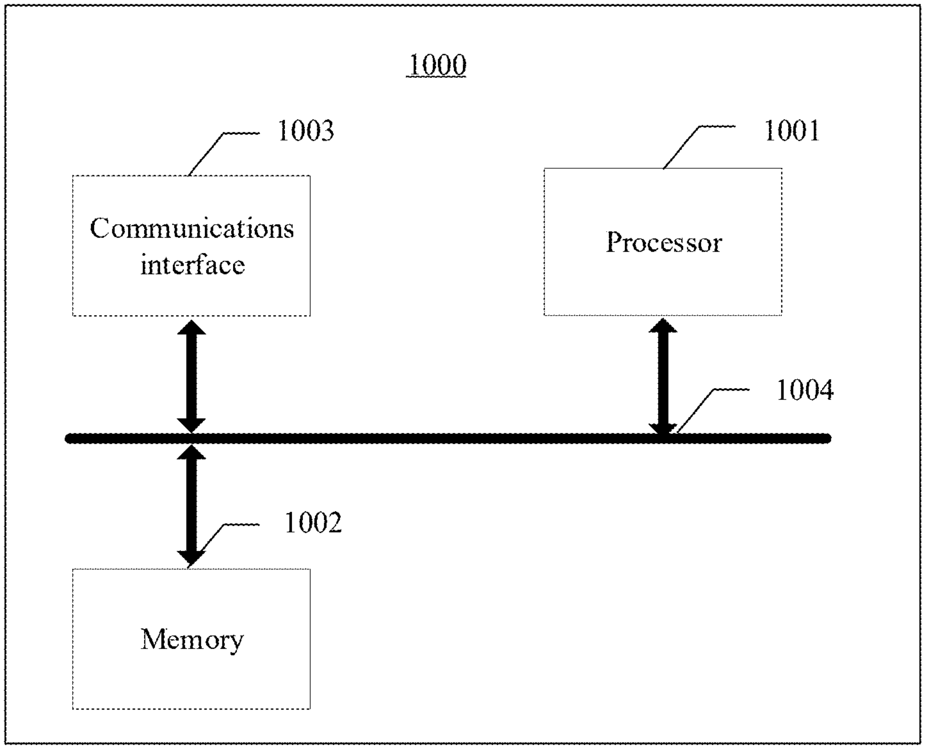
FIG. 10 is a schematic diagram of a structure of a second map generation apparatus according to an embodiment of this application.

A map generation apparatus 1000 shown in FIG. 10 includes at least one processor 1001. The map generation apparatus 1000 further includes at least one memory 1002, configured to store a program instruction and/or data. The memory 1002 is coupled to the processor 1001. The coupling in the embodiments of this application may be indirect coupling or a communications connection between apparatuses, units, or modules, may be in electrical, mechanical or other forms, and is used for information exchange between apparatuses, units, or modules. The processor 1001 may cooperate with the memory 1002. The processor 1001 may execute the program instructions stored in the memory 1002, and at least one of the at least one memory 1002 may be included in the processor 1001.

The map generation apparatus 1000 may further include a communications interface 1003, configured to communicate with another device by using a transmission medium, so that the map generation apparatus 1000 may communicate with the another device. In the embodiments of this application, the communications interface may be a transceiver, a circuit, a bus, a module, or another type of communications interface. In the embodiments of this application, when the communications interface is a transceiver, the transceiver may include a separate receiver and a separate transmitter, or may include a transceiver with an integrated transceiver function, an interface circuit, or the like.

It should be understood that a connection medium between the processor 1001, the memory 1002, and the communications interface 1003 is not limited in the embodiments of this application. In the embodiments of this application, the memory 1002, the processor 1001, and the communications interface 1003 are connected by using a communications bus 1004 in FIG. 10. The bus is represented by a thick line in FIG. 10, and connections between other components are merely examples for description, and shall not be construed as a limitation. The bus may include an address bus, a data bus, a control bus, and the like. For ease of representation, in FIG. 10, only one thick line is used to represent the bus, but it does not indicate that there is only one bus or only one type of bus or the like.

In an example, the map generation apparatus 1000 is configured to implement the steps performed by the server in the procedure shown in FIG. 5*a*. The map generation apparatus 1000 may be a server, or a chip or a circuit in the server. The communications interface 1003 is configured to perform related receiving and sending operations on a server side in the foregoing embodiments. The processor 1001 is configured to perform processing-related operations on a server side in the foregoing method embodiments.

For example, the processor 1001 is configured to generate a broadcast signal strength layer according to the plurality of pieces of first information, where the broadcast signal strength layer is used to represent a first coverage range corresponding to a first strength range of a broadcast signal modulated at the first modulation frequency. A plurality of pieces of first information are received by using the communications interface 1003, where each piece of the first information includes a positioning location of the terminal, strength of a broadcast signal modulated at a first modulation frequency and received by the terminal at the positioning location, and the first modulation frequency.

Figure 11:
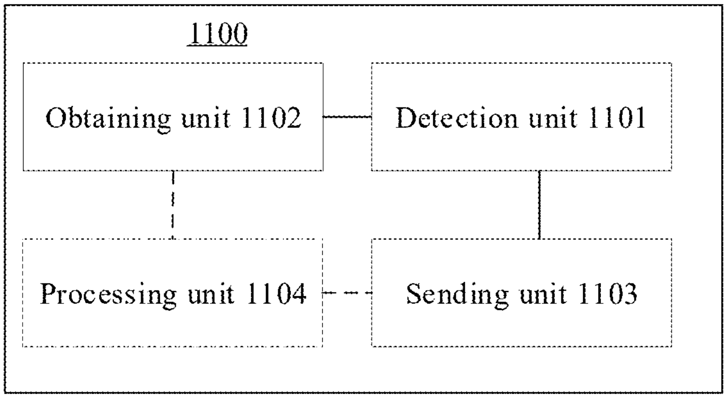
FIG. 11 is a schematic diagram of a structure a third map generation apparatus according to an embodiment of this application.

FIG. 11 is a block diagram of a structure of a map generation apparatus 1100 according to an embodiment of this application. For example, the map generation apparatus 1100 is, for example, a terminal. The map generation apparatus 1100 includes a detection unit 1101, an obtaining unit 1102, and a sending unit 1103. Optionally, the apparatus may further include a processing unit 1104. The obtaining unit 1102 and the sending unit 1103 may be communications units in the terminal, and the detection unit 1101 and the processing unit 1104 may be a detection unit and a processing unit in the terminal, the obtaining unit 1102, the sending unit 1103, the detection unit 1101, and the processing unit 1104 may communicate with each other in a wired manner or a wireless manner. For example, the map generation apparatus 1100 may be a terminal. For example, the terminal includes a user equipment, a terminal device, a vehicle, or an in-vehicle apparatus in a vehicle. The terminal may be a terminal device, or may be a chip applied to a terminal device, or may be a map generation apparatus in a terminal device, or may be a chip applied to a map generation apparatus in a terminal device. The terminal may also be a vehicle with a map generation function, a chip applied to a vehicle with a map generation function, or the terminal may be an in-vehicle apparatus of a vehicle with a map generation function, a chip applied to an in-vehicle apparatus of a vehicle with a map generation function, or a combination device or a component with a map generation function in an in-vehicle apparatus, or other combined devices or components with a map generation function. When the map generation apparatus 1100 is a terminal, the obtaining unit 1102 and the sending unit 1103 may be a transceiver, and may include an antenna, a radio frequency circuit, and the like, or may be an interface circuit coupled to a processor. The detection unit 1101 may be a processor, for example, a baseband processor, and the baseband processor may include one or more central processing units (CPU). When the map generation apparatus 1100 is a component with a terminal function, the obtaining unit 1102 and the sending unit 1103 may be radio frequency units, the detection unit 1101 may be a device with a function of detecting broadcast signal strength, or the detection unit 1101 may be coupled on one processor with the processing unit 1104, alternatively, on a separate processor. When the map generation apparatus 1100 is a chip system, the obtaining unit 1102 and the sending unit 1103 may be input/output interfaces of the chip system (for example, a baseband chip), and the determining unit may be a processor of the chip system, and may include one or more central processing modules.

The detection unit 1101 and the processing unit 1104 may be configured to perform all operations other than sending and receiving operations performed by the terminal in the embodiment shown in FIG. 5*a*, and/or configured to support another process of the technology described in this specification. The obtaining unit 1102 may be configured to perform all obtaining operations performed by the terminal in the embodiment shown in FIG. 5*a*, and/or configured to support another process of the technology described in this specification. The sending unit 1103 may be configured to perform all sending operations performed by the terminal in the embodiment shown in FIG. 5*a*, and/or configured to support another process of the technology described in this specification.

In addition, the obtaining unit 1102 and the sending unit 1103 may be a function module, and the function module can complete both a sending operation and a receiving operation. For example, the obtaining unit 1102 and the sending unit 1103 are modules included in the map generation apparatus 1100, the obtaining unit 1102 and the sending unit 1103 may be configured to perform all sending operations and receiving operations performed by the terminal in the embodiment shown in FIG. 5*a*. For example, when the sending operation is performed, it may be considered that the sending unit 1103 is a sending module, and when the receiving operation is performed, the obtaining unit 1102 may be considered as a receiving module. Alternatively, the obtaining unit 1102 and the sending unit 1103 may be a general term of two function modules. The two function modules are respectively a sending module and a receiving module, and the sending module is configured to complete a sending operation. For example, the sending unit 1103 is a module included in the terminal, the sending module may be configured to perform all sending operations performed by the terminal in the embodiment shown in FIG. 5*a*, and the receiving module is configured to complete a receiving operation. For example, the obtaining unit 1102 is a module included in the terminal, and the receiving module may be configured to perform all receiving operations performed by the terminal in the embodiment shown in FIG. 5*a*.

The obtaining unit 1102 is configured to obtain a first positioning location of the terminal. The detection unit 1101 is configured to detect strength of a broadcast signal received by the terminal at the first positioning location. The sending unit 1103 is configured to send first information to a server, where the first information includes the first positioning location, the strength of the broadcast signal received by the terminal at the first positioning location, and a modulation frequency of the broadcast signal, and the first information is used to determine a coverage range corresponding to a strength range of a broadcast signal in a broadcast signal strength layer.

In a possible implementation, the apparatus further includes a processing unit 1104, configured to: before the sending unit 1103 sends the first information to the server, determine, by comparing the strength of the broadcast signal received by the terminal at the first positioning location with a preset threshold of the strength range, that the first positioning location is at a boundary of the coverage range.

Figure 12:
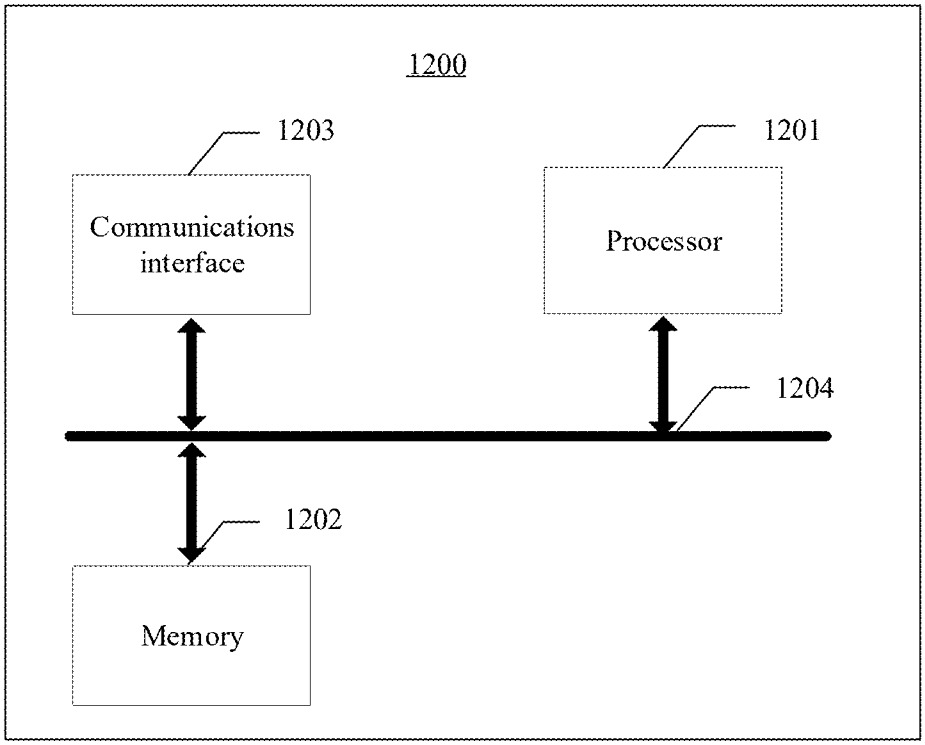
FIG. 12 is a schematic diagram of a structure of a fourth map generation apparatus according to an embodiment of this application.

A map generation apparatus 1200 shown in FIG. 12 includes at least one processor 1201. The map generation apparatus 1200 further includes at least one memory 1202, configured to store a program instruction and/or data. The memory 1202 is coupled to the processor 1201. The coupling in the embodiments of this application may be indirect coupling or a communications connection between apparatuses, units, or modules, may be in electrical, mechanical or other forms, and is used for information exchange between apparatuses, units, or modules. The processor 1201 may cooperate with the memory 1202. The processor 1201 may execute the program instructions stored in the memory 1202, and at least one of the at least one memory 1202 may be included in the processor 1201.

The map generation apparatus 1200 may further include a communications interface 1203, configured to communicate with another device by using a transmission medium, so that the map generation apparatus 1200 may communicate with the another device. In the embodiments of this application, the communications interface may be a transceiver, a circuit, a bus, a module, or another type of communications interface. In the embodiments of this application, when the communications interface is a transceiver, the transceiver may include a separate receiver and a separate transmitter, or may include a transceiver with an integrated transceiver function, an interface circuit, or the like.

It should be understood that a connection medium between the processor 1201, the memory 1202, and the communications interface 1203 is not limited in the embodiments of this application. In the embodiments of this application, the memory 1202, the processor 1201, and the communications interface 1203 are connected by using a communications bus 1204 in FIG. 12. The bus is represented by a thick line in FIG. 12, and connections between other components are merely examples for description, and shall not be construed as a limitation. The bus may include an address bus, a data bus, a control bus, and the like. For ease of representation, in FIG. 12, only one thick line is used to represent the bus, but it does not indicate that there is only one bus or only one type of bus or the like.

In an example, the map generation apparatus 1200 is configured to implement the steps performed by the terminal in the procedure shown in FIG. 5*a*. The map generation apparatus 1200 may be a terminal, or a chip or a circuit in the terminal. The communications interface 1203 is configured to perform receiving and sending-related operations on a terminal side in the foregoing embodiment. The processor 1201 is configured to perform processing-related operations on a terminal side in the foregoing method embodiments.

For example, the processor 1201 is configured to detect strength of a broadcast signal received by the terminal at the first positioning location.

In a possible implementation, the processor 1201 is further configured to: before sending the first information to the server, determine, by comparing the strength of the broadcast signal received by the terminal at the first positioning location with the preset threshold of the strength range, that the first positioning location is at a boundary of the coverage range.

Figure 13:
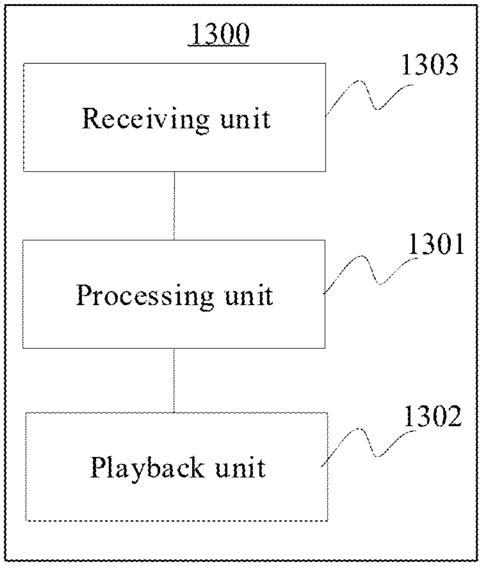
FIG. 13 is a schematic diagram of a structure of a first broadcast signal playback apparatus according to an embodiment of this application.

FIG. 13 is a block diagram of a structure of a broadcast signal playback apparatus 1300 according to an embodiment of this application. For example, the broadcast signal playback apparatus 1300 is, for example, a terminal. The broadcast signal playback apparatus 1300 includes a processing unit 1301 and a playback unit 1302, and optionally, may further include a receiving unit 1303. The receiving unit 1303 may be a communications unit in the terminal, and the processing unit 1301 may be a processing unit in the terminal. The playback unit 1302 and the processing unit 1031, or the receiving unit 1303 and the processing unit 1301 may communicate with each other in a wired manner or a wireless manner. For example, the broadcast signal playback apparatus 1300 may be a terminal. For example, the terminal includes a user equipment, a terminal device, a vehicle, or an in-vehicle apparatus in a vehicle. The terminal may be a terminal device, or may be a chip applied to a terminal device, or may be a broadcast signal playback apparatus in a terminal device, or may be a chip applied to a broadcast signal playback apparatus in a terminal device. The terminal may also be a vehicle with a broadcast signal playback function, a chip applied to a vehicle with a broadcast signal playback function, or the terminal may be an in-vehicle apparatus of a vehicle with a broadcast signal playback function, a chip applied to an in-vehicle apparatus of a vehicle with a broadcast signal playback function, or a combined device or component with a broadcast signal playback function in an in-vehicle apparatus, or other combined devices or components with a broadcast signal playback function. When the broadcast signal playback apparatus 1300 is a terminal, the receiving unit 1303 may be a transceiver, and may include an antenna, a radio frequency circuit, and the like, or may be an interface circuit coupled to a processor. The processing unit 1301 may be a processor, for example, a baseband processor, and the baseband processor may include one or more central processing units (CPU). When the broadcast signal playback apparatus 1300 is a component with a terminal function, the receiving unit 1303 may be a radio frequency unit, and the processing unit 1301 may be a processor, for example, a baseband processor. When the broadcast signal playback apparatus 1300 is a chip system, the receiving unit 1303 may be an input/output interface of the chip system (for example, a baseband chip), and a determining unit may be a processor of the chip system, and may include one or more central processing modules.

The processing unit 1301 may be configured to perform all operations other than sending and receiving operations performed by the terminal in the embodiment shown in FIG. 6, FIG. 7*a*, or FIG. 8*a*, and/or configured to support another process of the technology described in this specification. The receiving unit 1303 may be configured to perform all receiving operations performed by the terminal in the embodiment shown in FIG. 6, FIG. 7*a*, or FIG. 8*a*, and/or configured to support another process of the technology described in this specification.

In addition, the receiving unit 1303 may be a function module, and the function module can complete both a sending operation and a receiving operation. For example, the receiving unit 1303 is a module included in the broadcast signal playback apparatus 1300, and the receiving unit 1303 may be configured to perform all sending operations and receiving operations performed by the terminal in the embodiment shown in FIG. 6, FIG. 7*a*, or FIG. 8*a*. For example, when a sending operation is performed, it may be considered that the receiving unit 1303 is a sending module, and when a receiving operation is performed, it may be considered that the receiving unit 1303 is a receiving module. Alternatively, the receiving unit 1303 may be a general term of two function modules. The two function modules are respectively a sending module and a receiving module, and the sending module is configured to complete a sending operation. For example, if the receiving unit 1303 is a module included in the terminal, the sending module may be configured to perform all sending operations performed by the terminal in the embodiment shown in FIG. 6, FIG. 7*a*, or FIG. 8*a*, and the receiving module is configured to complete a receiving operation. For example, if the receiving unit 1303 is a module included in the terminal, the receiving module may be configured to perform all receiving operations performed by the terminal in the embodiment shown in FIG. 6, FIG. 7*a*, or FIG. 8*a*.

The receiving unit 1303 is configured to receive a broadcast signal strength layer from a map server, where the broadcast signal strength layer is a map layer, and the broadcast signal strength layer is used to represent a coverage range of a broadcast signal corresponding to a strength level of the broadcast signal. The processing unit 1301 is configured to switch, at a first moment according to a current positioning location of the terminal, a current motion status of the terminal, a future driving path of the terminal, and the broadcast signal strength layer, from a first state in which only a first broadcast signal is received to a second state in which both a first broadcast signal and a second broadcast signal are received, where types of the first broadcast signal and the second broadcast signal are different; play the received first broadcast signal at a single rate by using a playback unit 1302 when the terminal is in the first state; and play the received first broadcast signal by using the playback unit 1302 when the terminal is in the second state.

In a possible implementation, there is a delay in the second broadcast signal relative to the first broadcast signal, and the processing unit 1301 is configured to play the first broadcast signal at a rate lower than the single rate by using the playback unit 1302 when the terminal is in the second state. The processing unit 1301 is further configured to switch, at a second moment, from the second state to a third state in which only the second broadcast signal is received, where the second moment is a moment of first synchronization between the played first broadcast signal and the received second broadcast signal; and play the second broadcast signal at the single rate by using the playback unit 1302 when the terminal is in the third state.

In a possible implementation, there is a delay in the first broadcast signal relative to the second broadcast signal, and the processing unit 1301 is configured to play the first broadcast signal at the single rate by using the playback unit 1302, and buffer the received second broadcast signal when the terminal is in the second state. The processing unit 1301 is further configured to: switch, at the second moment, from the second state to a third state in which only the second broadcast signal is received, where the second moment is a moment of second synchronization between the played first broadcast signal and a start buffered second broadcast signal; play the buffered second broadcast signal at a rate higher than the single rate by using the playback unit 1302 when the terminal is in the third state, and continue to buffer the received second broadcast signal; switch from the third state to a fourth state at a third moment, where the third moment is a moment of third synchronization between the buffered second broadcast signal and the played second broadcast signal; and play the received second broadcast signal at the single rate by using the playback unit 1302 when the terminal is in the fourth state.

Only one or more of the units in FIG. 13 may be implemented by software, hardware, firmware, or a combination thereof. The software or firmware includes but is not limited to a computer program instruction or code, and may be executed by a hardware processor. The hardware includes but is not limited to various integrated circuits, such as a central processing unit (CPU), a digital signal processor (DSP), a field programmable gate array (FPGA), or an application-specific integrated circuit (ASIC).

Figure 14:
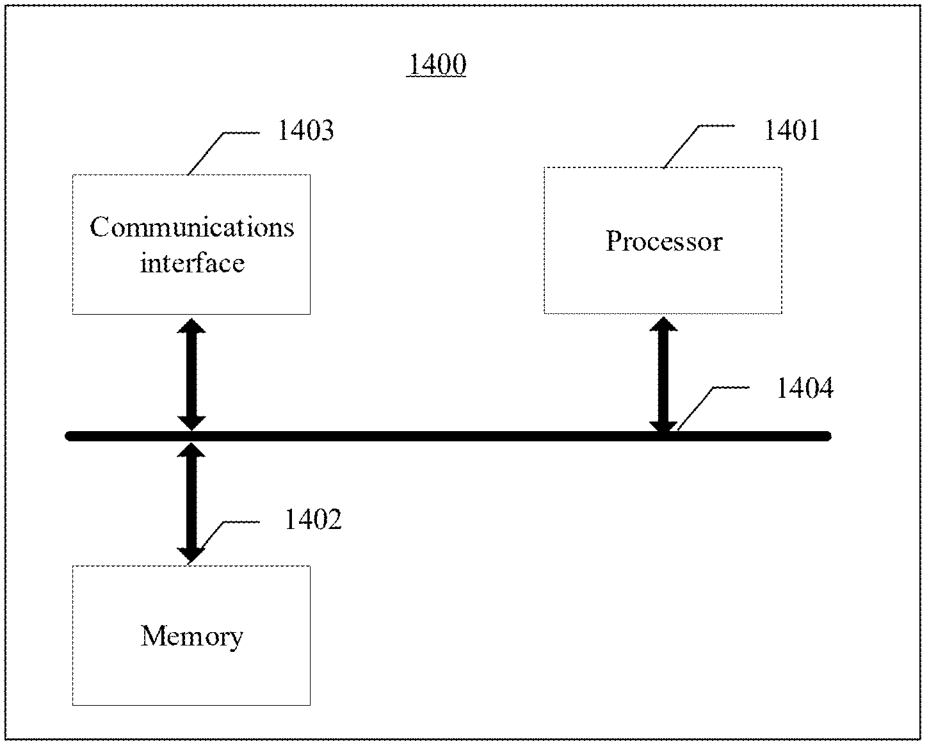
FIG. 14 is a schematic diagram of a structure of a second broadcast signal playback apparatus according to an embodiment of this application.

The broadcast signal playback apparatus 1400 shown in FIG. 14 includes at least one processor 1401. The broadcast signal playback apparatus 1400 further includes at least one memory 1402, configured to store a program instruction and/or data. The memory 1402 is coupled to the processor 1401. The coupling in the embodiments of this application may be indirect coupling or a communications connection between apparatuses, units, or modules, may be in electrical, mechanical or other forms, and is used for information exchange between apparatuses, units, or modules. The processor 1401 may cooperate with the memory 1402. The processor 1401 may execute the program instructions stored in the memory 1402, and at least one of the at least one memory 1402 may be included in the processor 1401.

The broadcast signal playback apparatus 1400 may further include a communications interface 1403, configured to communicate with another device by using a transmission medium, so that the broadcast signal playback apparatus 1400 may communicate with other devices. In the embodiments of this application, the communications interface may be a transceiver, a circuit, a bus, a module, or another type of communications interface. In the embodiments of this application, when the communications interface is a transceiver, the transceiver may include a separate receiver and a separate transmitter, or may include a transceiver with an integrated transceiver function, an interface circuit, or the like.

It should be understood that a connection medium between the processor 1401, the memory 1402, and the communications interface 1403 is not limited in the embodiments of this application. In the embodiments of this application, the memory 1402, the processor 1401, and the communications interface 1403 are connected by using a communications bus 1404 in FIG. 13. The bus is represented by a thick line in FIG. 13, and connections between other components are merely examples for description, and shall not be construed as a limitation. The bus may include an address bus, a data bus, a control bus, and the like. For ease of representation, in FIG. 13, only one thick line is used to represent the bus, but it does not indicate that there is only one bus or only one type of bus or the like.

In an example, the broadcast signal playback apparatus 1400 is configured to implement the steps performed by the terminal shown in FIG. 6, FIG. 7*a*, or FIG. 8*a*. The broadcast signal playback apparatus 1400 may be a terminal, or a chip or a circuit in the terminal. The communications interface 1403 is configured to perform receiving and sending-related operations on a terminal side in the foregoing embodiment. The processor 1401 is configured to perform processing-related operations on a terminal side in the foregoing method embodiments.

For example, the processor 1401 is configured to switch, at a first moment according to a current positioning location of the terminal, a current motion status of the terminal, a future driving path of the terminal, and the broadcast signal strength layer, from a first state in which only a first broadcast signal is received to a second state in which both a first broadcast signal and a second broadcast signal are received, where types of the first broadcast signal and the second broadcast signal are different; play the received first broadcast signal at a single rate when the terminal is in the first state; and play the received first broadcast signal when the terminal is in the second state.

An embodiment of this application further provides a communications system. The communications system includes a map generation apparatus 900 or a map generation apparatus 1000. The communications system includes a map generation apparatus 1100 or a map generation apparatus 1200, and may further include a broadcast signal playback apparatus 1300 or a broadcast signal playback apparatus 1400.

An embodiment of this application further provides a computer storage medium. The computer-readable storage medium stores an instruction. When the instruction is run on a processor, the positioning apparatus is enabled to perform the method in any possible implementation of the foregoing embodiments.

An embodiment of this application further provides a computer program product including an instruction. The computer program product stores the instruction. When the instruction is run on a processor, the positioning apparatus is enabled to perform the method in any possible implementation of the foregoing embodiments.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by a combination of hardware and software modules in the processor.

In this embodiment of this application, the memory may be a non-volatile memory, such as a hard disk drive (HDD) or a solid-state drive (SSD), or may be a volatile memory, such as a random-access memory (RAM). The memory is, but not limited to, any other medium that can be used to carry or store desired program code in a form of instructions or data structures and that can be accessed by a computer. The memory in the embodiments of this application may also be a circuit or any other apparatus capable of implementing a storage function, and is configured to store program instructions and/or data.

All or a part of the method provided in the embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present application are all or partially generated. The computer may be a general-purpose computer, a special-purpose computer, a computer network, a network device, a user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clear that a person skilled in the art can make various modifications and variations to this application without departing from the scope of this application. This application is intended to cover these modifications and variations of this application provided that they fall within the scope of protection defined by the following claims and their equivalent technologies.

In this embodiment of this application, at least one means one or more, and a plurality of means two or more. The term and/or describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between associated objects. "At least one of the following items (pieces)" or a similar expression thereof refers to any combination of these items, including any combination of singular items (pieces) or plural items (pieces). For example, at least one of a, b, or c may represent a or b or c; a and b; a and c; b and c; or a, b, and c, where a, b, and c each may be singular or plural.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

In the several embodiments provided in this application, it should be understood that the disclosed apparatus and method may be implemented in other manners. For example, the described embodiment is merely an example. For example, the module or unit division is merely logical function division and may be other divisions in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement embodiments without creative efforts.

In addition, the described apparatuses, methods, and schematic diagrams of different embodiments may be combined or integrated with other systems, modules, technologies, or methods without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A map generation apparatus, comprising at least one processor and at least one memory coupled to the at least one processor, wherein the at least one memory stores program instructions that when executed by the at least one processor, cause the map generation apparatus to perform operations comprising:

receiving a plurality of pieces of first information, wherein each piece of the plurality of pieces of first information comprises a corresponding positioning location of a corresponding terminal, strength of a broadcast signal modulated at a first modulation frequency and received by the corresponding terminal at the corresponding positioning location, and the first modulation frequency; and generating a broadcast signal strength layer according to the plurality of pieces of first information and at least one coverage range corresponding to at least one strength range of a broadcast signal modulated at a second modulation frequency by training data in the plurality of pieces of first information, wherein the at least one coverage range is preset based on a modulation frequency of a broadcast signal and geographic information, wherein the broadcast signal strength layer represents a first coverage range corresponding to a first strength range of the broadcast signal modulated at the first modulation frequency.

2. The map generation apparatus according to claim 1, wherein the operations further comprise:

determining a boundary of the first coverage range according to a plurality of positioning locations in the plurality of pieces of first information.

3. The map generation apparatus according to claim 2, wherein the operations further comprise:

determining the boundary of the first coverage range according to (1) a plurality of comparison results obtained by separately comparing strength that is of each broadcast signal received by a respective terminal at a respective positioning location and that is in the plurality of pieces of first information with a preset first strength threshold, and (2) the plurality of positioning locations in the plurality of pieces of first information.

4. The map generation apparatus according to claim 1, wherein the broadcast signal strength layer further represents a second coverage range corresponding to a second strength range of the broadcast signal modulated at the first modulation frequency.

5. The map generation apparatus according to claim 1, wherein the operations further comprise:

receiving a plurality of pieces of second information, wherein each piece of the plurality of pieces of second information comprises a respective positioning location of a respective terminal, strength of a broadcast signal modulated at the second modulation frequency and received by the respective terminal at the respective positioning location, and the second modulation frequency, wherein the broadcast signal strength layer is generated further according to the plurality of pieces of second information, and wherein the broadcast signal strength layer further represents the at least one coverage range.

6. The map generation apparatus according to claim 5, wherein the plurality of pieces of first information are from a plurality of terminals.

7. A map generation apparatus, comprising at least one processor and at least one memory, wherein the at least one memory stores program instructions that when executed by the at least one processor, cause the map generation apparatus to perform operations comprising:

obtaining a first positioning location of a terminal;

detecting strength of a broadcast signal received by the terminal at the first positioning location; and sending first information to a server, wherein the first information comprises the first positioning location, the strength of the broadcast signal received by the terminal at the first positioning location, and a modulation frequency of the broadcast signal, and the first information is used to determine a coverage range corresponding to a strength range of a broadcast signal in a broadcast signal strength layer, wherein the broadcast signal strength layer is generated according to a plurality of pieces of first information comprising the first information and at least one coverage range corresponding to at least one strength range of a broadcast signal modulated at a second modulation frequency by training data in the plurality of pieces of first information, and wherein the at least one coverage range is preset based on a modulation frequency of a broadcast signal and geographic information.

8. The map generation apparatus according to claim 7, wherein the operations further comprise:

determining, by comparing the strength of the broadcast signal received by the terminal at the first positioning location with a preset threshold of the strength range, that the first positioning location is at a boundary of the coverage range.

9. An apparatus for playing broadcast signal, the apparatus comprising at least one processor and at least one memory, wherein the at least one memory stores program instructions that when executed by the at least one processor, cause the apparatus to perform operations comprising:

receiving, a broadcast signal strength layer from a map server, wherein the broadcast signal strength layer is a map layer, and the broadcast signal strength layer represents a coverage range of a broadcast signal corresponding to a strength level of the broadcast signal;

switching, at a first moment according to a current positioning location of a terminal, a current motion status of the terminal, a future driving path of the terminal, and the broadcast signal strength layer, from a first state in which only a first broadcast signal is received to a second state in which both the first broadcast signal and a second broadcast signal are received, wherein types of the first broadcast signal and the second broadcast signal are different, wherein there is a delay in the second broadcast signal relative to the first broadcast signal;

playing, the received first broadcast signal at a single rate when the terminal is in the first state;

playing, the received first broadcast signal when the terminal is in the second state, wherein the first broadcast signal is performed at a lower rate than the single rate when being in the second state;

switching, at a second moment, from the second state to a third state in which only the second broadcast signal is received, wherein the second moment is a moment of first synchronization between the played first broadcast signal and the received second broadcast signal; and playing, the second broadcast signal at the single rate when the terminal is in the third state.

10. The apparatus according to claim 9, wherein there is a delay in the first broadcast signal relative to the second broadcast signal, the terminal plays the first broadcast signal at the single rate and buffers the received second broadcast signal when being in the second state, and the operations further comprise:

switching, at a second moment, from the second state to a third state in which only the second broadcast signal is received, wherein the second moment is a moment of second synchronization between the played first broadcast signal and the buffered second broadcast signal;

playing, in the third state, the buffered second broadcast signal at a rate higher than the single rate, and continuing to buffer the received second broadcast signal;

switching, from the third state to a fourth state at a third moment, wherein the third moment is a moment of third synchronization between the buffered second broadcast signal and the played second broadcast signal; and playing, the received second broadcast signal at the single rate when being in the fourth state.

* * * * *